(12) United States Patent
Kapaun

(10) Patent No.: US 11,441,786 B2
(45) Date of Patent: Sep. 13, 2022

(54) GEOTHERMAL SYSTEM HAVING A FLOW VECTOR ASSEMBLY

(71) Applicant: Steve Kapaun, Ames, IA (US)

(72) Inventor: Steve Kapaun, Ames, IA (US)

( * ) Notice: Subject to any disclaimer, the term of this patent is extended or adjusted under 35 U.S.C. 154(b) by 0 days.

(21) Appl. No.: 15/342,935

(22) Filed: Nov. 3, 2016

(65) Prior Publication Data
US 2017/0122573 A1 May 4, 2017

Related U.S. Application Data

(63) Continuation-in-part of application No. 14/368,717, filed as application No. PCT/US2012/072150 on Dec. 28, 2012.

(60) Provisional application No. 62/250,567, filed on Nov. 4, 2015, provisional application No. 61/581,470, filed on Dec. 29, 2011.

(51) Int. Cl.
| | |
|---|---|
| F24D 12/02 | (2006.01) |
| F24D 15/04 | (2006.01) |
| F24F 5/00 | (2006.01) |
| F24T 10/15 | (2018.01) |
| F28F 27/02 | (2006.01) |
| F28D 7/06 | (2006.01) |
| F28D 7/02 | (2006.01) |
| F28D 7/10 | (2006.01) |

(52) U.S. Cl.
CPC ............ *F24D 12/02* (2013.01); *F24D 15/04* (2013.01); *F24F 5/0046* (2013.01); *F24T 10/15* (2018.05); *F28F 27/02* (2013.01); *F24D 2200/11* (2013.01); *F24F 2005/0057* (2013.01); *F28D 7/02* (2013.01); *F28D 7/06* (2013.01); *F28D 7/10* (2013.01); *Y02B 10/40* (2013.01); *Y02B 30/00* (2013.01); *Y02E 10/10* (2013.01)

(58) Field of Classification Search
CPC ................ F24D 3/18; F24J 3/08; F24J 3/081
See application file for complete search history.

(56) References Cited

U.S. PATENT DOCUMENTS

| | | | | |
|---|---|---|---|---|
| 4,054,399 A * | 10/1977 | Maurer | ...................... | F04F 7/02 417/226 |
| 4,287,723 A * | 9/1981 | Dosmond | .................. | F24D 3/18 62/238.6 |
| 4,350,181 A * | 9/1982 | Kreeley | ..................... | F16K 7/07 137/15.09 |
| 4,798,240 A * | 1/1989 | Gerstmann | ................ | F24D 3/08 165/48.1 |

(Continued)

OTHER PUBLICATIONS

International Preliminary Examining Authority, "Notification of Transmittal of The International Preliminary Report On Patentability", (Chapter II of the Patent Cooperation Treaty) for PCT/US2016/060686, dated Feb. 13, 2018, 2018, 11 pages.

(Continued)

*Primary Examiner* — Jianying C Atkisson
*Assistant Examiner* — Meraj A Shaikh
(74) *Attorney, Agent, or Firm* — Zarley Law Firm, P.L.C

(57) ABSTRACT

A geothermal system having a flow station connected to a heat pump that is connected to a heat pump that is connected to a flow vector assembly. The flow vector assembly is connected to a heating coil and a cooling coil disposed within the ductwork of a furnace. The flow vector assembly may also be connected to a flow helix heat exchanger assembly.

18 Claims, 17 Drawing Sheets

(56) References Cited

U.S. PATENT DOCUMENTS

| | | | | |
|---|---|---|---|---|
| 5,244,037 | A * | 9/1993 | Warnke | F24D 3/18 |
| | | | | 165/104.31 |
| 5,671,608 | A * | 9/1997 | Wiggs | F25B 30/06 |
| | | | | 62/260 |
| 7,373,785 | B2 * | 5/2008 | Kidwell | F25B 30/06 |
| | | | | 62/260 |
| 2007/0235179 | A1 * | 10/2007 | Phillips | F24F 3/001 |
| | | | | 165/244 |
| 2012/0247719 | A1 | 10/2012 | Kidwell | |
| 2014/0352916 | A1 * | 12/2014 | Kapaun | F24T 10/00 |
| | | | | 165/45 |

OTHER PUBLICATIONS

International Searching Authority, "Notification of Transmittal of The International Search Report and The Written Opinion of the International Searching Authority", for PCT/US2016/060686, dated Apr. 10, 10 pages.

* cited by examiner

GEOTHERMAL SYSTEM HAVING A FLOW VECTOR ASSEMBLY

CROSS REFERENCE TO A RELATED APPLICATIONS

This application claims the benefit of U.S. Provisional Patent Application Ser. No. 62/250,567 filed Nov. 4, 2015 and is a Continuation-in-Part of U.S. National Phase patent application Ser. No. 14/368,717 filed Jun. 25, 2014 which claims the benefit of International Patent Application Serial No. PCT/US2012/072150 filed Dec. 28, 2012 which claims the benefit of U.S. Provisional Patent Application Ser. No. 61/581,470 filed Dec. 29, 2011.

Flow Vector Assembly

This invention is directed to a geothermal system and more particularly a geothermal system having a flow vector assembly and a flow ray valve.

The need for an auxiliary heat source is well known within the heating and air conditioning industry. Auxiliary heat is particularly needed when weather conditions, such as extreme cold, demand more heat than a heat pump is capable of producing, which is known as a the threshold temperature or balance point. When outdoor temperatures are above the balance point the heat pump will produce enough heat to meet the space heating demand. When outdoor temperatures are below the balance point an auxiliary heat source is needed to meet the space demand for heat. In typical electric applications, the juxtaposition of the heat pump heat exchanger and the auxiliary heat source heat exchanger (e.g., electrical resistance elements) allow for a true supplemental heat sequence of operation. Namely, the heat pump is able to operate below the balance point yielding all the heat it is capable of while one or more resistive elements upstream of the heat pump heat exchanger are activated which boosts the air temperature. In essence, the heat pump heat exchanger pre-heats the air entering the resistive elements, whereby the elements supplement the air warming function of the heat pump. Due to the mechanical advantage associated with heat pumps, more heat per watt of electricity is produced compared with the resistive elements and it is therefore advantageous to operate the heat pump below the balance point as long as the cost of the BTU remains favorable.

When considering heat pumps in heating dominant applications, the prevailing philosophy when sizing the equipment heating capacity is to oversize beyond the cooling load where the heat pump also performs an air conditioning function. The oversizing is designed to minimize the operation of the auxiliary heat source, while allowing for adequate dehumidification in the cooling mode. Gross oversizing presents problems for humidity control as it is a function of run time. If the unit is too large the space temperature is lowered too quickly without the required number of air circulations through the cooling coil to remove moisture. With air to air heat pumps oversizing is inherently limited due to the precipitous drop in capacity once outdoor temperatures drop below 32 degrees F. The equipment capacity would be inconceivably large as would the ductwork to convey the larger volume of air in order to offset the decline in output associated with operation during very cold weather. With geothermal heat pumps no such limitation is present as the output of a geothermal heat pump is largely unaffected by outdoor temperatures. Consequently geothermal heat pumps can be safely oversized beyond cooling load requirements by a much larger margin than air to air heat pumps. By their very nature geothermal heat pumps have enhanced dehumidification properties, thereby negating the normally encountered problems associated with oversizing. As a result balance points are dramatically different for the two types of heat pumps as are the demand requirements for the auxiliary heat source. Air to air heat pumps, with a higher balance point; require substantially higher auxiliary heating capacity. With either heat pump type, high utility costs are present due to the presence of the electric resistance elements within the system. The cost to operate the resistive elements can be anywhere from two to four times the cost of the heat pump operation. The operating costs of resistive elements and the associated need for additional electrical capacity to safely operate them have driven the adoption of fossil fuel auxiliary heat sources also known as hybrid systems.

The current state of the art negates the possibility of the supplementation of heat afforded by the use of resistive elements, due to the juxtaposition of the heat exchangers previously discussed and creates an either/or nature of the hybrid system operating sequence. Either the heat pump operates to meet all of the heating demand when outdoor temperatures are above the balance point, or the fossil fuel furnace operates below the balance point. The two operating sequences can never operate simultaneously. The current state of the art determines the state of operation. Current hybrid systems have a refrigerant coil heat exchanger installed above, or upstream, from the fossil fuel furnace heat exchanger. When the heat pump is in operation, the furnace blower drives air through a dormant fossil fuel heat exchanger and into the refrigerant heat exchanger when in the cooling mode. The air is then cooled and dehumidified by the cold refrigerant coil. When in the heating mode, above the balance point, the furnace blower drives air through the dormant fossil fuel heat exchanger and into the refrigerant heat exchanger where the air is warmed anywhere from 15 to 30 degrees F. and typically discharges at between 85 and 100 degrees F. When the outdoor temperature drops below the balance point the furnace blower drives air through an active fossil fuel heat exchanger warming the air anywhere from 40 to 70 degrees F. and discharging air between 110 and 140 degrees F. The warmed air then passes through the dormant refrigerant coil heat exchanger. If the fossil fuel heat exchanger discharges air at 110 degrees F., then a favorable exchange of heat cannot occur with the refrigerant coil heat exchanger which is only capable of 100 degrees F. If the two sequences of operation operated at the same time the heat pump would be damaged. Accordingly, a need exists for a geothermal system that addresses these deficiencies.

Therefore, an objective of the present invention is to provide a geothermal system that eliminates the need to oversize beyond the cooling load in order to minimize excessive operating costs associated with electrical resistance elements and resort to either/or sequences of operation.

Another objective of the present invention is to provide a geothermal system where refrigerant is selectively and automatically diverted to a plurality of heat exchangers to enable a supplemental heat sequence of operation in hybrid heat pump installations.

A still further objective of the present invention is to provide a geothermal system where the sequence of operation is based upon economic and environmental considerations and not mechanical limitations. Another objective of the present invention is to provide a geothermal system that minimizes the use of heat resistive elements.

Yet another objective of the present invention is to provide a geothermal system that eliminates the need for increasing electrical capacity in buildings being considered for new or retrofit heat pump installations.

A still further objective of the present invention is to provide a geothermal system that is less expensive to operate and install.

BRIEF SUMMARY OF THE INVENTION

A geothermal system having a heat pump connected to and in fluid communication with a flow vector assembly. A cooling coil and a heating coil, both of which are positioned in the duct work of a furnace, are connected to and in fluid communication with the flow vector assembly.

In a cooling mode refrigerant flows from the heat pump to the flow vector assembly, then to the cooling coil where liquid refrigerant is flashed into gas, and the heated gas flows back to the flow vector assembly and then to the heat pump.

In a heating mode hot gas flows from the heat pump to the flow vector assembly and is diverted to the heating coil where the hot gas is condensed into liquid. From the heating coil the liquid flows back to the flow vector assembly and then to the heat pump.

DETAILED DESCRIPTION OF THE PREFERRED EMBODIMENT

Figure 1:
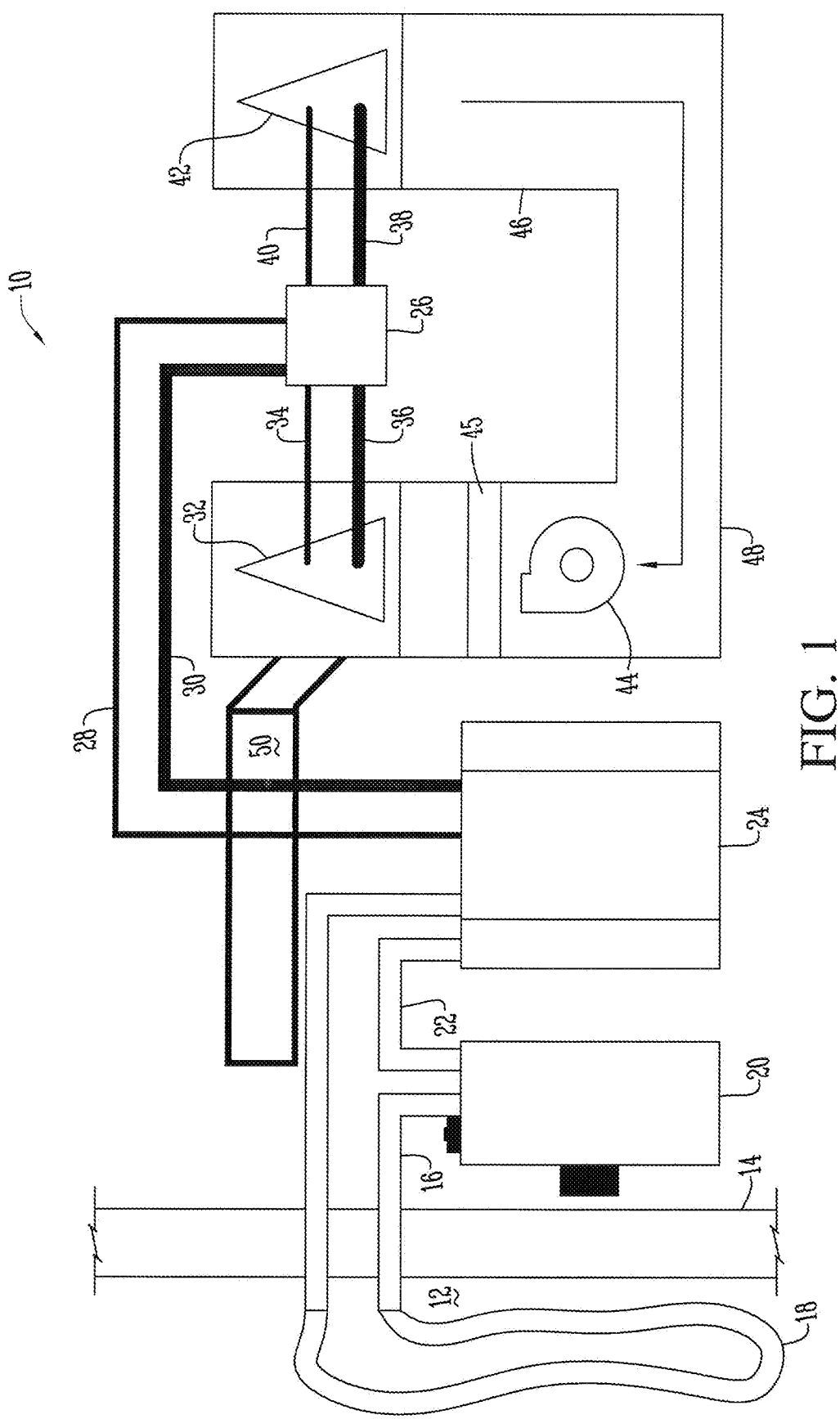
FIG. 1 is a schematic view of a geothermal system.

Referring to FIG. 1, a geothermal system 10 conveys energy to and from the ground 12 adjacent a basement wall 14 of a dwelling. A first conduit 16 allows a transfer fluid such as glycol or the like to flow from ground loops 18 to a flow station 20. A second conduit 22 extends between and is in communication with the flow station 20 and a heat pump 24. Preferably the heat pump is a geothermal split system heat pump. Extending between and in communication with the heat pump 24 and a flow vector assembly 26 are third and fourth conduits 28 and 30. Between the flow vector assembly 26 and a cooling coil 32 are fifth and sixth conduits 34 and 36, while seventh and eighth conduits 38 and 40 extend between the flow vector assembly 26 and a heating coil 42. Both the cooling coil 32 and heating coil 42, as well as a blower 44 and a fossil fuel heat exchanger 45, are located within the ductwork 46 of a furnace 48. The ductwork 46 is connected to and in communication with a supply air duct 50.

In a cooling mode, a thermostat (not shown) sends a cooling signal to the geothermal system 10 where the furnace 48 energizes the blower 44 such that air begins circulating through the ductwork 46 and supply air duct 50. Unconditioned air passes through the dormant heating coil 42 and is conducted via the ductwork 46 through the furnace 48 into and out of the blower 44, through the dormant fossil fuel heat exchanger 45 and through the active cooling coil 32. As the air passes through the active cooling coil 32 the air is chilled and dehumidified (i.e., conditioned) and is then discharged to the supply air duct 50 where the conditioned air is distributed throughout the building. The conditioned air is also recycled through the system 10 until the thermostat demand is satisfied.

Figure 2:
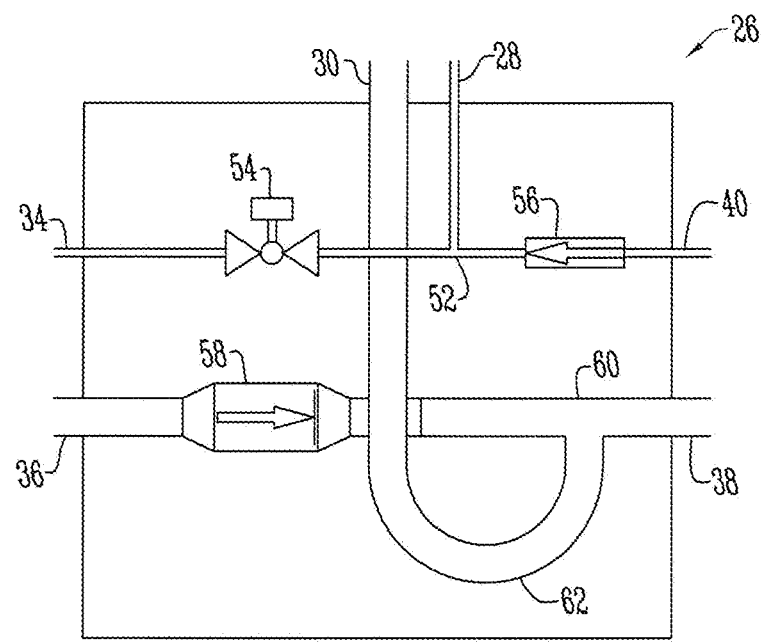
FIG. 2 is a side view of a flow vector assembly.

Simultaneous to the activation of the blower 44 is the activation of the heat pump 24. Compressor operation is initiated within the heat pump 24 and liquid refrigerant begins to flow from the heat pump 24 via conduit 28 to the flow vector assembly 26 and gaseous refrigerant begins to flow from the flow vector assembly 26 to the heat pump 24 via fourth conduit 30. The flow vector assembly 26 is of any configuration. In one embodiment, as shown in FIG. 2, the flow vector assembly 26 has a t-section 52 where flow is forced from the third conduit 28 to an open solenoid valve 54 due to the presence of a check valve 56. The solenoid valve 54 is energized and opened when the cooling mode is activated by the thermostat. The solenoid valve 54 is connected to and in communication with a fifth conduit 34 such that liquid refrigerant passes through the open solenoid valve 54 and exits the flow vector assembly 26 and enters the active cooling coil 32 where the liquid refrigerant is flashed into a gas where heat is absorbed. The heated gas exits the active cooling coil 32 as a superheated gas, as is common with all direct expansion cooling systems. From the cooling coil 32, the refrigerant flows through the fifth conduit 34 back to the flow vector assembly 26 through a second check valve 58. From the second check valve 58 the refrigerant flows to a second t-section 60. Low pressure created by the compressor suction line or fourth conduit 30 draws the refrigerant toward the compressor in the heat pump 24. Simultaneously, any liquid refrigerant in the heating coil 42 is recovered into circulation via seventh conduit 38. An oil trap 62 in fourth conduit 30 ensures adequate velocity for oil return to the compressor sump. This process continues until the thermostat space cooling demand is satisfied.

In the heating mode the thermostat sends a heating demand signal to the system 10 which energizes the blower 44. The airflow function is the same as above except now the heating coil 42 is active and air exiting the heating coil is heated as it passes through the ductwork 46, through the dormant fossil fuel heat exchanger 45, and through the dormant cooling coil 32 to the supply air duct 50. Heated air is then distributed to the building and the process is repeated until the thermostat heating demand is satisfied.

Figure 3:
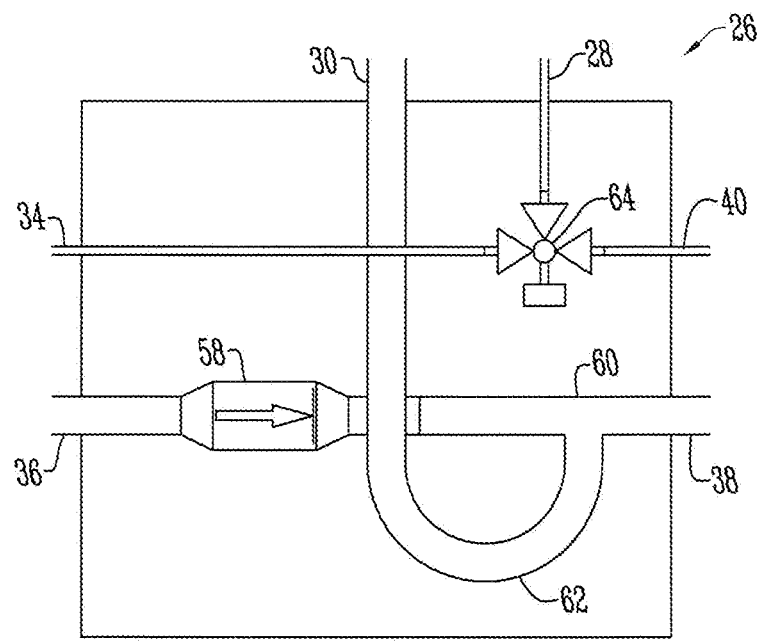
FIG. 3 is a side view of a flow vector assembly.

Simultaneously, the thermostat heating demand signal is sent to the heat pump 24 where the heat pump 24 reverses the flow of the refrigerant with an integral reversing valve which causes hot gas to flow from the pump 24 through the fourth conduit 30 to the flow vector assembly 26. As shown in FIG. 3, the refrigerant encounters the oil trap 62 and flows through the second t-section 60. The second check valve 58 causes refrigerant to flow through the seventh conduit 38 to the heating coil 42. The heating coil 38 liberates the heat content of the refrigerant to the air stream where the heated gaseous refrigerant is condensed into liquid. From the heating coil 38 the liquid refrigerant flows via the eighth conduit 40 to the flow vector assembly 26 where the liquid refrigerant flows through the first check valve 56 and encounters a de-energized closed solenoid valve 54. This causes the liquid refrigerant to flow through the first t-section 52 through the third conduit 28 and return to the heat pump 24 to repeat the cycle until the space heating demand is satisfied.

When outdoor temperatures are below the balance point the geothermal system 10 enables the preheating of air entering the fossil fuel furnace 48 and allows the furnace 48 to operate in conjunction with the heat pump 24 in a true supplemental heat sequence of operation. When the space thermostat sends an auxiliary heat demand signal to the system 10 the fossil fuel heat exchanger 45 can be activated in conjunction with the heat pump 24. Once activated, the fossil fuel heat exchanger 45 boosts the temperature of the air preheated by the heat pump 24 and the heating coil 42 to meet the space heating demands when the outdoor temperatures fall below the balance point.

In another embodiment as shown in FIG. 3 the flow vector assembly 26 a three port valve 64 is used in place of the first t-section, the first check valve, and the solenoid valve. When liquid refrigerant enters the flow vector assembly 26 through third conduit 28 the liquid refrigerant is diverted to the cooling coil 32 through the fifth conduit 34 by the three port valve 64 while isolating the heating coil 42 and the eighth conduit 40 during a cooling mode. In the heating mode the three port valve 64 deflects flow from the eighth conduit 40 to the fourth conduit 28 while isolating flow to the cooling coil 32 and the fifth conduit 34.

Figure 4:
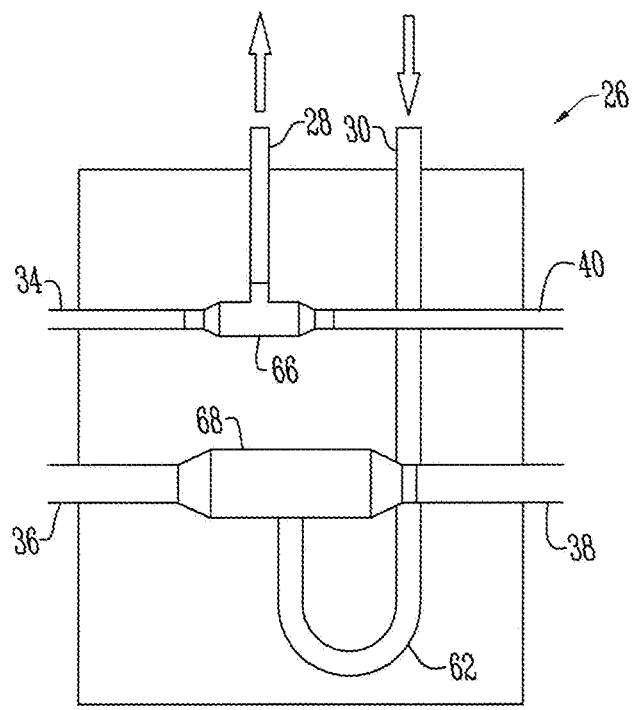
FIG. 4 is a side view of a flow vector assembly.

Alternatively, in a preferred embodiment as shown in FIG. 4, a pair of flow ray valves 66 and 68 are used instead of a three port valve 64 and the second check valve 58 to perform the cooling mode and heating mode of the system 10 as previously described. Automatic vectoring of refrigerant flow paths are achieved through the flow valves 66 and 68 by means of the kinetic energy of the moving refrigerant and/or the differential pressure created by the moving refrigerant or heat pump 24. This embodiment is particularly advantageous in that it requires fewer component parts to complete the flow vector assembly 26 and eliminates the need for an electrically actuated valve to shift between heating and cooling modes.

Figure 5:
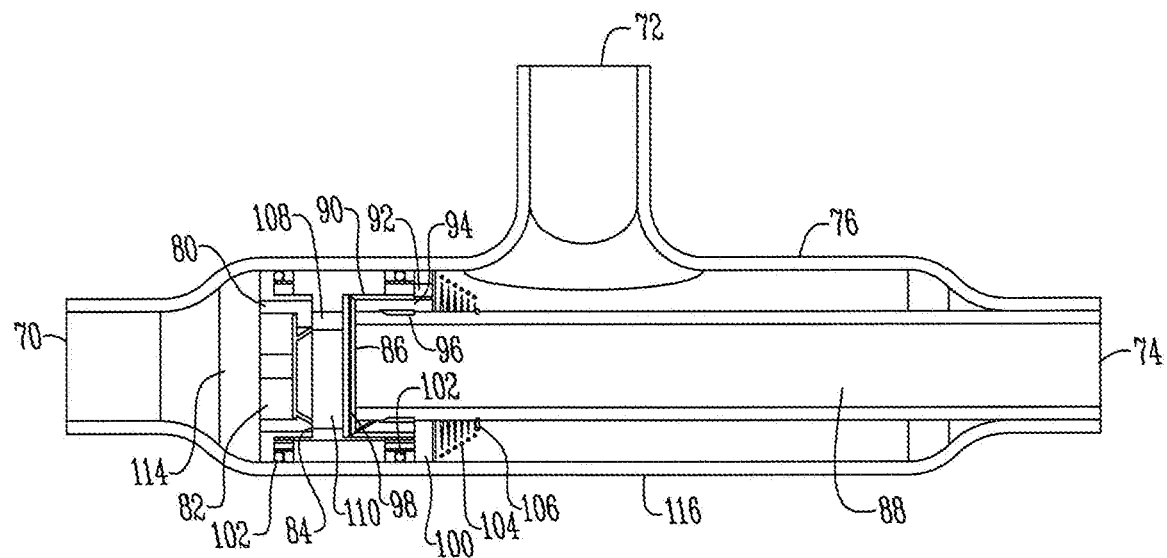
FIG. 5 is a side sectional view of a flow ray valve in a first position.
Figure 6:
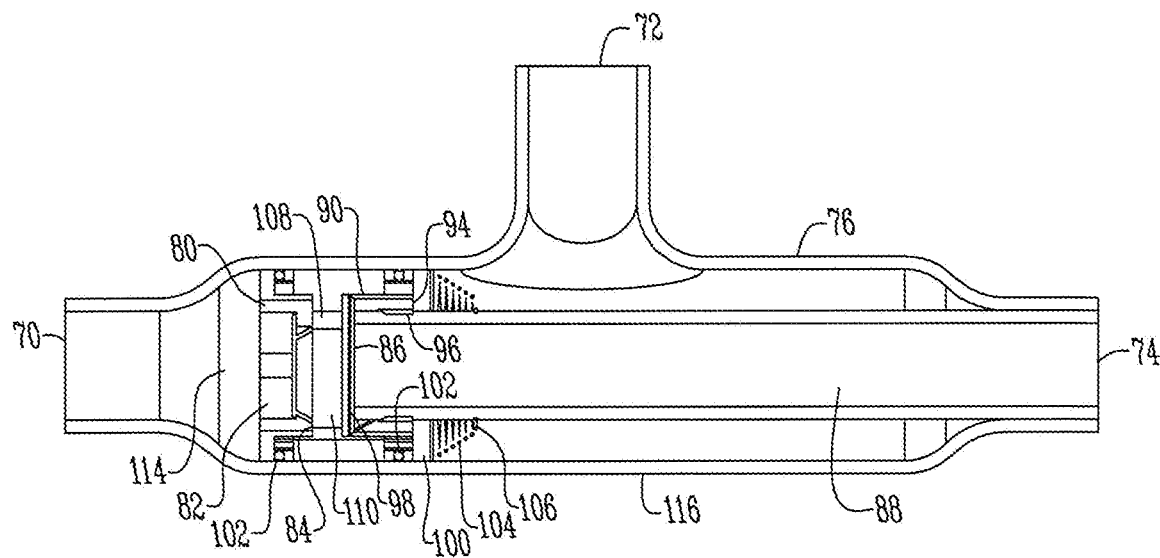
FIG. 6 is a side sectional view of a flow ray valve in a second position.

The flow ray valves 66 and 68 are of any size, shape and structure and preferably have three ports 70, 72, and 74 in a t-shaped housing 76 as shown in FIGS. 5-6. Disposed within the housing 76 near port 70 is a ventilated upper torbulus 80 having ventilation ports 82 and a sealing surface 84. Adjacent the sealing surface 84 is a seat disc 86 which selectively engages the sealing surface 84 to prevent flow of refrigerant.

Mounted about a conduit 88 is a ventilated lower torbulus 90 that has a series of outer ventilation ports 92 and a series of inner coaxial ventilation ports 94. The conduit 88 conveys refrigerant between port 74 and chamber 110. The lower torbulus 90 further has a coaxial conduit receiver 96 a pair of sealing surfaces 98 and a second seat 100. Positioned to engage the second seat 100 to prevent refrigerant flow is a second seat annulus 102. A tapered compression spring 104 fits over conduit 88 to hold the annulus 102 in sealing contact with the second seat 100. A retaining ring 106 is attached to the conduit 88 to hold the compression spring 104 in place and prevent migration down the conduit 88.

The upper torbulus 80 and lower torbulus 90 are connected by a plurality of dimensioned stand-offs 108 that provide a predetermined spacing between the valve's 66 and 68 positions. The predetermined space forms a sub-chamber 110 and allows the seat disc 86 to move back and forth. A pair of O-rings 112 fit in grooves 113 formed at the perimeter of the upper torbulus 80 and the lower torbulus 90 which creates three separate chambers 110, 114, and 116 common to port 70.

In operation, when refrigerant flow is established through port 70, refrigerant flows into chamber 114 and through upper ventilated torbulus 80 at ventilation ports 82. The refrigerant flow unseats and relocates sealing disc 86 from its first position against sealing surface 84 to its second position against sealing surfaces 98. This forms a seal at sealing surfaces 98 which prevents flow through conduit 88 and port 74. Refrigerant then enters chamber 116 through the outer ventilation ports 92 of the lower torbulus 90 and displaces the second seat annulus 102 from the second seat 100, compressing spring 104 and permitting refrigerant to flow into chamber 116 which is common to port 72 such that a flow path is created from port 70 to port 72 with no flow to port 74.

When refrigerant enters port 74 the refrigerant flows through conduit 88 and displaces disc 86 from sealing surfaces 98 to sealing surface 84 to establish a seal with the upper torbulus 80 and preventing flow to port 70. The refrigerant then passes into chamber 110, through outer ventilation ports 92 and coaxial inner ventilation ports 94 into chamber 116 thus creating a flow path from port 74 to port 72 with no flow to port 70.

When refrigerant enters through port 72, and the valve 66 or 68 is in a first position where the disc 86 engages sealing surface 84, the refrigerant enters chamber 116 and encounters the second seat annulus 102 and sealed second seat 100 such that flow is prevented through outer ventilation ports 82 and flow is permitted through the coaxial inner ventilation ports 94 into chamber 110. From chamber 110 the refrigerant flows through conduit 88 to port 74 thus creating a flow path from port 72 to port 74 with no flow to port 70.

When refrigerant enters though port 72, and the valve 66 or 68 is in a second position where the disc 86 engages sealing surfaces 98, the refrigerant flows into chamber 116 and encounters the disc 86 at the coaxial inner ventilation ports 94 where the disc 86 is moved or actuated from its second position to its first position where the disc 86 engages sealing surface 84 creating a flow path from port 72 to port 74 and no flow to port 70.

In another embodiment the upper torbulus 80 has a centrally located through hole 120 that receives a cylindrical magnet 122. The depth of the magnet 122 is adjustable prior to attachment in order to govern the degree of pull exerted on the disc 86. The lower torbulus 90 has a plurality of holes 124 that each receive a magnet 126. The depth of the magnets 126 are likewise adjustable to govern the pull force exerted on the disc 86 or the second seat annulus 102. The use of the magnets 126 eliminate the need for the compression spring 104. With the use of the magnets 122 and 126, the disc 86 and the second seat annulus 102 are made of a ferromagnetic material. Alternatively, the upper and lower torbuli 80 and 90 are made of ferromagnetic material and the disc 86 and second seated annulus 102 being made of a magnetic material.

Actuation of the flow ray valve 66 and 68 is limited by the number of times one shifts from heating to cooling mode and vice versa. If pressures equalize when the equipment is idle, the disc 86 could dislodge and need to reseat at the next on cycle. The retaining magnet 122 or 126 holds the disc 86 at its last actuated position reducing the wear and tear on the sealing surfaces of both the disc 86 and the torbuli 80 and 90. Fluid strainers are used to prevent ferromagnetic detritus within the sealed system from accumulating at the magnets and potentially disrupting the sealing operation of the disc 86 or second seated annulus 102

Figure 7:
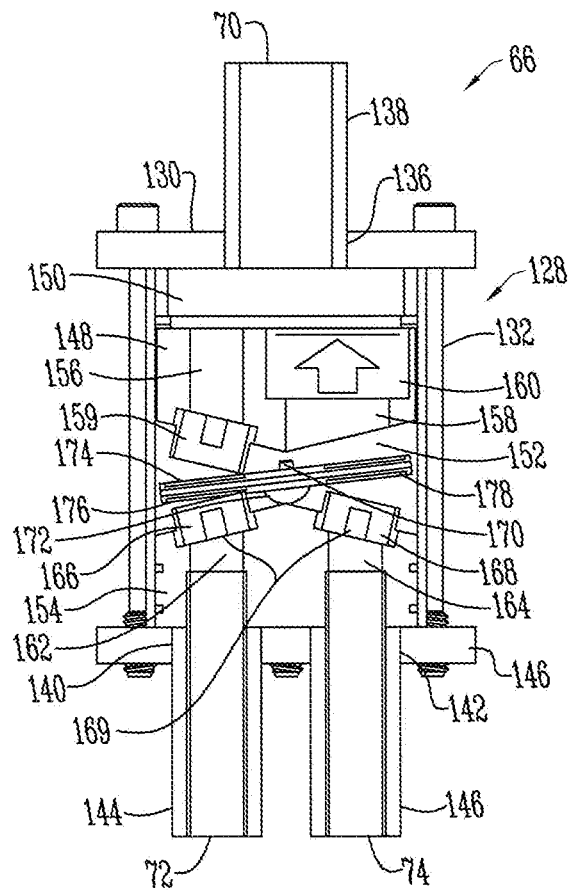
FIG. 7 is a side sectional view of a flow ray valve.

In yet another embodiment, as shown in FIG. 7, of the flow ray valve 66 and 68. The valve 66 and 68 has ports 70, 72, and 74. The valve 66 and 68 has a valve body 128 with a top wall 130, side walls 132, and a bottom wall 134. The top wall 130 has an opening 136 that receives a first conduit 138. The bottom wall 134 has a pair of openings 140 and 142 that receive a pair of conduits 144 and 146.

Disposed within the valve body 128 is an upper ventilated block 148 that is spaced parallel relation to the top wall 130 to form a chamber 150 between the top wall 130 and the upper block 148 and a second chamber 152 between the upper block 148 and a lower ventilated block 154. The upper block 148 has a first channel 156 and a second channel 158 both in fluid communication with chambers 150 and 152. The first channel 156 has an angled seal seat 159 at its lower end and the second channel 158 has a check valve 160 that prevents flow from chamber 150 to chamber 152 through channel 158.

The lower block 154 has a pair of channels 162 and 164 that are in fluid communication with conduits 144 and 146. Both channels 162 and 164 have angled seal seats 166 and 168 at their upper ends. Each seat 159, 166, and 168 has a rare earth magnet 169 disposed therein.

Disposed between the upper block 148 and the lower block 154 is a toggle beam 170. The toggle beam 170 pivots about a pivot bearing 172 that is positioned between seats 166 and 168. Connected to the toggle beam 170 and in selective alignment with seats 159, 166, and 168 are floating seats 174, 176, and 178.

In operation, where refrigerant flows through port 72 to conduit 144 and channel 162, the refrigerant will dislodge floating seat 176 from seal seat 166. The toggle beam 170 will pivot causing floating seals 174 and 178 to engage seal seats 159 and 168 preventing flow into channel 156 and 164. Refrigerant will flow into chamber 152 to channel 158 through check valve 160 to chamber 150 and out port 70. When refrigerant flows through port 74 the toggle beam will pivot to prevent flow to port 72 and allow flow to port 70. Finally, when refrigerant flows through port 70, the toggle beam pivots to prevent flow to port 72 and allows flow to port 74.

Thus, a geothermal system has been show that, at the very least, meets all the stated objectives.

Ram Valve

In an alternative embodiment the flow vector assembly 26 includes a ram valve 180 used for refrigerant flow reversal, a necessary function in heat pumps of all types. Presently, reversal valves utilize a pilot operated shuttle valve assembly where the valve has four ports of entry or exit. One port is dedicated for refrigerant entry from a hot gas discharge conduit of the system compressor and two ports provide possible exits of refrigerant. When the reversal valve is at rest, the refrigerant discharge from compressor enters a first port and circulates within the valve body and exits at a second rest port. A third port communicates directly with a fourth port via a refrigerant pathway in the shuttle valve. The fourth port is a dedicated port of exit connected to the suction conduit of the refrigerant compressor. Accordingly, the flow pathways, when the conventional reversing valve is at rest, includes flow from the first port to the second port and flow from the third port to the fourth port.

When the reversal valve is energized to a second operating position by the pilot operated solenoid, the interior shuttle moves laterally, and flow is reversed through the second and third ports and the flow pathways provide flow from the first port to the third port, and separately, from the second port to the fourth port. The reversal of flow directions allows the locus of evaporator and condenser to be reversed, thus enabling the rejection of heat to either the indoor environment or outdoor environment and conversely a simultaneous locus shift for the absorption of heat either indoors or outdoors depending upon the mode of operation selected at the space thermostat.

The inherent weakness of this approach is revealed when considering the method of valve construction. The movement of the shuttle is what enables the reversing of flow patterns. This poses a significant compromise in pressure and temperature transfer through the valve body, resulting in efficiency loss. The shuttle is elongated and with an elongated laterally sliding seal. The seal is subject to abrasive wear and also presents a limiting factor when considering the integrity of the seal. An elongated seal is inherently weaker than a seal that is symmetric through its center axis as in the case of a circular seal.

Another weakness of existing valves relates to undesirable heat transfer. The elongated body of the shuttle provides a greater surface area for the undesirable heat transfer that occurs within the valve body. The shuttle separates the system's high pressure, high temperature gaseous refrigerant from the system's low pressure, low temperature gaseous refrigerant. While these flow paths are discreet, they are in such close proximity that unfavorable heat transfer is inescapable. Also, the presence of the inherently weak laterally sliding seal between the divergent pressure zones means leakage can easily rise above a negligible quantity. The combination of negative heat and pressure transfer detrimentally affect the system performance and efficiency.

Figure 8:
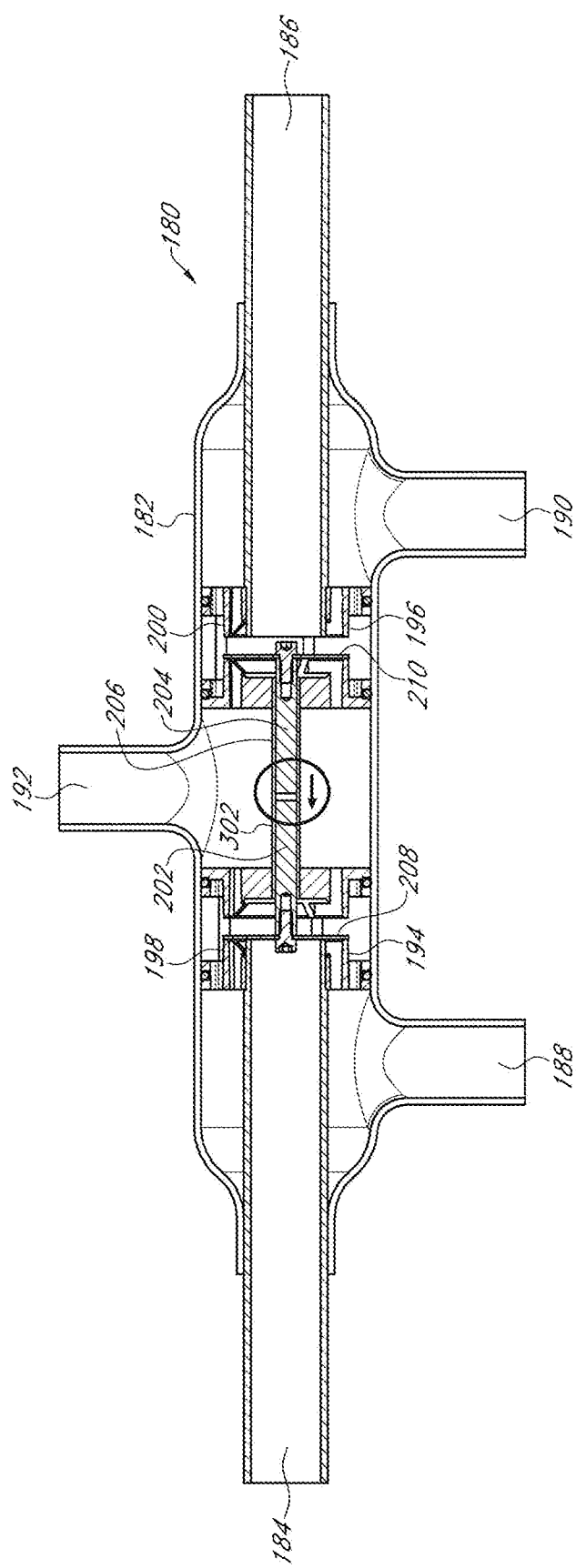
FIG. 8 is a side section view of a ram valve.

One way of improving upon these problems is through use of a ram valve 180. As shown by example only in FIG. 8, thermal valve 180 has a valve body 182 having a first port 184 and a second port 186 for entry of discharge refrigerant. A third port 188 is an exit port for refrigerant entering the first port 184 and a fourth port 190 is an exit port for refrigerant entering the second port 186. A firth port 192 is in communication with the compressor to provide suction.

Disposed within the valve body 182, between the third port 188 and the fourth port 190, in spaced relation, are a first turbulus 194 and a second turbulus 196 that have a first seat 198 and a second seat 200 that are ventilated. Extending between the torbulii 194 and 196 are a first 202 and a second 204 ramrod. The ramrods 202 and 204 are confined to and slide within a loosely fitting bearing conduit 206 which provides a coercive slide path for the ramrods 202 and 204. Attached to the first ramrod 202 is a first disc 208 and a second disc 210 is attached to the second ramrod 204.

In operation, when high pressure compressor discharge refrigerant enters first port 184, the refrigerant encounters the first disc 208 and moves the first disc 208 and the first ramrod 202 toward second port 186. The first ramrod 202 engages the second ramrod 204 causing the second ramrod 204 and second disc to move toward the second turbulus 196 and seal the second turbulus at second seat 200. The ramrods 204 and 206 have a predetermined space between one another that allow for maximum adhesive force from the differential pressure. In this first position fluid flows from the first port 184 to the third port 188 and suction flow path from second port 190 to fifth port 192, while isolating port 186.

When high pressure refrigerant discharge gas enters the second port 186, second disc 210 is dislodged from seat 200 and moves ramrod 204 toward port 184. Ramrod 204 engages ramrod 202 which causes disc 208 to engage seat 198. In this second position, discharge fluid flows from second port 186 to fourth port 190 while a suction flow path is created from the first port 188 to the fifth port 192, while isolating port 184.

Tandem Flow Ray Valve

Figure 9:
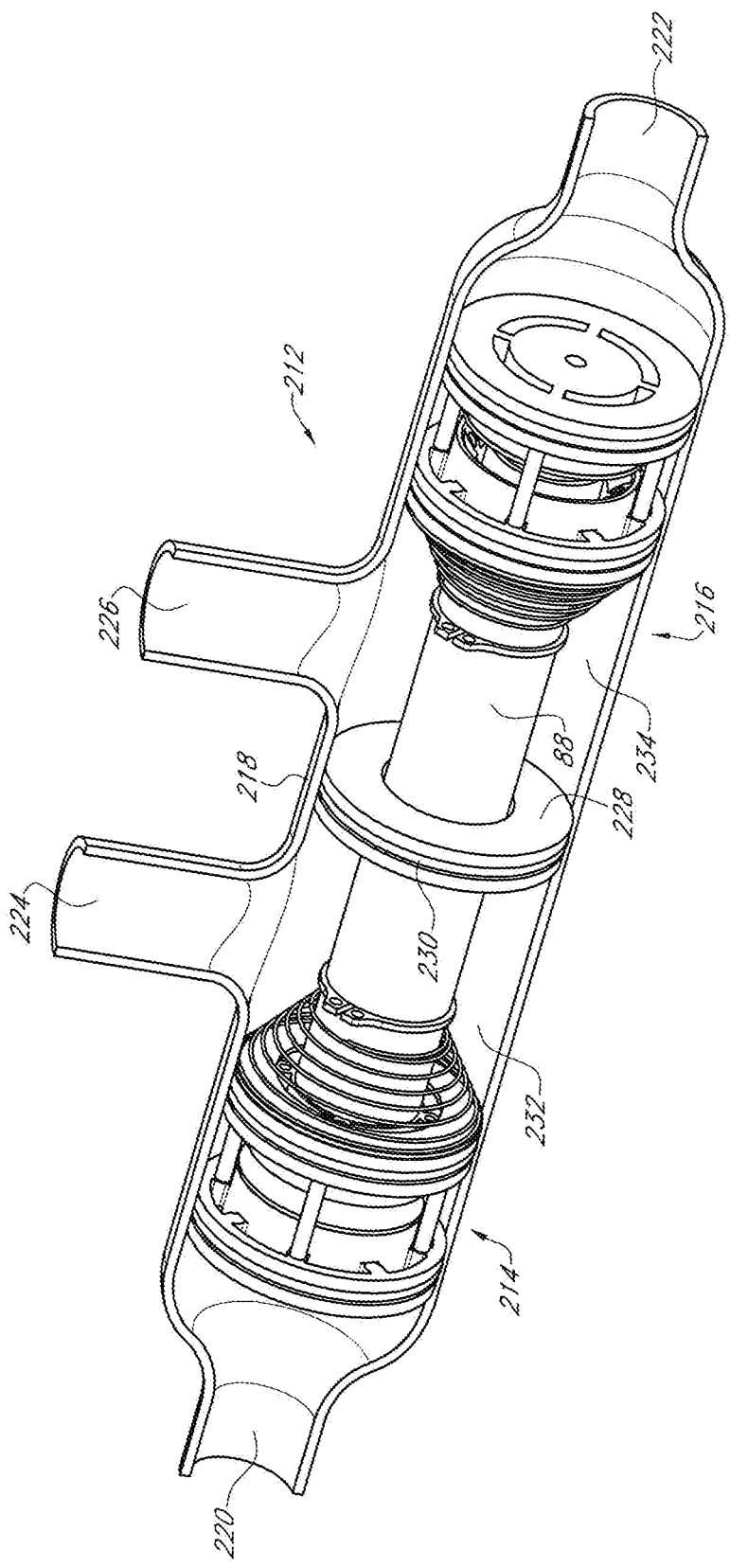
FIG. 9 is a perspective sectional view of a tandem flow ray valve.

In another embodiment, as shown in FIG. 9, utilized is a tandem flow ray valve 212 having a pair of flow ray assemblies 214 and 216 connected in series within a valve body 218. The flow ray assemblies 214 and 216 are consistent with the previous disclosure. The valve body 218 has a first port 220 and a second port 222 at each end of the valve body 218 and a third port 224 and a fourth port 226 on the side of the valve body 218.

Within the valve body 218, between the third and fourth port 224 and 226 is an annulus 228 that creates a seal between flow ray assemblies 214 and 216. The annulus 228 has an O-ring 230 that extends around the annulus and engages an interior surface of the valve body 218. Conduit 88 extends through the annulus 228 which separates the interior of the valve body into a first chamber 232 and a second chamber 234. FIGS. 9A-9F show various flow paths from entry to exit.

The flow path in FIG. 9A is of particular utility because the tandem flow ray valve merges the second and third ports as entry ports which flow to the four exit port. Also FIG. 8D shows two simultaneous but discreet flow paths from the first port 220 to the third port 224 and the second port 222 to the fourth port 226.

Geothermal System

Figure 10:
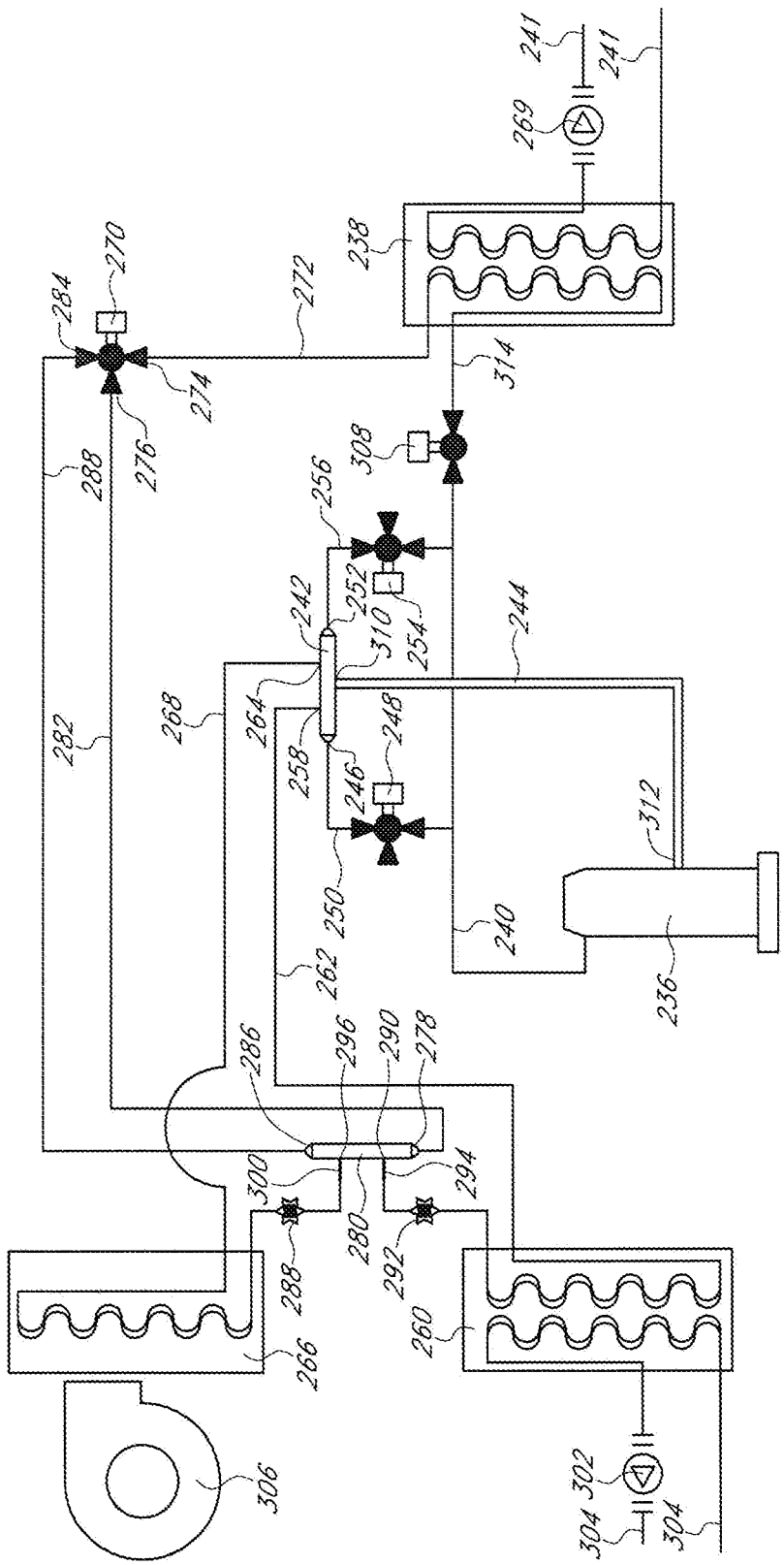
FIG. 10 is a schematic view of a geothermal system.

FIG. 10 shows a system of piping for a combination geothermal heat pump. The system includes a compressor 236 that is connected to a first heat exchanger 238 via conduit 240. The first heat exchanger 238 converts water to refrigerant to generate hot water. The compressor 236 also is connected to a ram valve 242 via conduit 244. A first port 246 of the ram valve 242 is connected to a first binary solenoid valve 248 via conduit 250. A second port 252 is connected to a second binary solenoid valve 254 via conduit 256. Both the first and second solenoid valves 248 and 254 are connected to conduit 240. A third port 258 of ram valve 242 is connected to a second heat exchanger 260 via conduit 262. A fourth port 264 is connected to a heat exchange coil 266 via conduit 268.

The first heat exchanger 238 has a water pump 269 to convey water antifreeze solution through a discreet circulating system 241. Heat exchanger 238 is connected to a three port solenoid valve 270 via conduit 272 at a first port 274. A second port 276 of valve 270 is connected to a first port 278 of a tandem flow ray valve 280 via conduit 282. A third port 284 of valve 270 is connected to a second port 286 of valve 280 via conduit 288.

A third port 290 of valve 280 is connected to a first metering device 292 which is connected in series to the second heat exchanger 260 via conduit 294. A fourth port 296 of valve 280 is connected to a second metering device 298 which is connected in series to the heat exchange coil 266 via conduit 300. The second heat exchanger has a second water pump 302 for pumping fluid through a ground loop system 304. Associated with the heat exchange coil 266 is an air circulating device 306.

In a heating mode hot gaseous refrigerant is discharged from compressor 236 and flows through conduit 240, by passing valves 248 and 308 to valve 254. From valve 254 refrigerant flows through conduit 256 to ram valve 242. From valve 242 refrigerant flows via conduit 268 to heat exchange coil 266. The air circulation device 306 is activated and liberates heat from the refrigerant into the air stream, condensing the refrigerant to a liquid. The liquid refrigerant exits coil 266 and passes through the second metering device 298 without a pressure drop the tandem flow ray valve 280 through fourth port 296 via conduit 300. Liquid refrigerant exits valve 280 through third port 290 and enters metering valve 292 via conduit 294 with a high pressure drop where liquid refrigerant is converted to a saturated vapor. The saturated vapor flows from metering valve 292 to the second heat exchanger 260. Pump 302 warms the refrigerant and superheats the refrigerant beyond the saturation temperature so that refrigerant exits heat exchanger 260 via conduit 262 as a low pressure, low temperature gas. The refrigerant then flows into ram valve 242 through port 258 and exits through port 310 and enters suction port 312 of compressor 236 via conduit 244.

When a simultaneous demand for hot water occurs solenoid valve 308 is opened and refrigerant flows through both paths of opened valves 254 and 308. The flow path through valve 254 is the same as previously described and the flow path through valve 308 passes hot compressor discharge gas through conduit 314 to first heat exchanger 238. Pump 269 liberates heat from the refrigerant into a liquid state while warming water pumped through exchanger 238. Liquid refrigerant exits exchanger 238 via conduit 272 and enters valve 270 through port 274. Refrigerant exits valve 270 through port 276 and flows through conduit 282 and enters valve 280 through port 278. The refrigerant exits port 290 and follows the same flow path as the flow path through valve 254 to the compressor 236. The tandem flow ray valve 280 permits simultaneous flow into ports 278 and 296 with a common exit port 290. This merging of flow paths is what enables the simultaneous operation of divergent modes without the need for shutdown and pressure equalization. If the warm air demand is satisfied while the hot water demand remains valve 54 is closed and the generation of hot water continues. If the demand for warm air remains and the demand for hot water is satisfied, then valve 308 is closed and the generation of warm air continues. The net result is the ability to generate heated water and heated air simultaneously, with the ability to oscillate between modes without shut down and pressure equalization.

In the cooling mode, high temperature refrigerant is conduit 240 bypasses closed valves 254 and 308 and flows to open cooling solenoid valve 248. From valve 248 refrigerant flows to ram valve 242 through conduit 250 and enters valve 242 through port 246. Refrigerant exits port 258 and flows to the second heat exchanger 260 via conduit 262. Pump 302 is simultaneously activated to circulate water through heat exchanger 260 where heat is liberated into the circulating water stream which condenses the gaseous refrigerant into liquid. The liquid refrigerant then flows through metering device 292 without a pressure drop and enters valve 280 through port 290.

Liquid refrigerant exits valve 280 through port 296 and flows to metering device 298 where the liquid refrigerant experiences a very high pressure drop converting the liquid refrigerant to a saturated vapor refrigerant stream. The saturated vapor stream flows to the heat exchange coil where the simultaneous activation of the air circulating device 306 warms the saturated vapor, while cooling the air stream. The refrigerant is superheated beyond the saturation temperature such that the refrigerant exits heating coil 266 as a low pressure, low temperature gas via conduit 268. The gaseous refrigerant flows to ram valve 242 and enters through port 264. The refrigerant exits through port 310 and flows to and enters compressor 236 through port 312 via conduit 244 to complete the cooling mode flow path cycle.

When simultaneous demand for hot water occurs, valve 248 can be closed while valve 308 is opened and the refrigerant flows through heat exchanger 238 to valve 270 and finally to the tandem flow ray valve 280. If valve 248 is left open, the net result is a reduction in hot water generating capacity. The flow path for hot water is the same as previously described until refrigerant reaches valve 270. Valve 270 is energized and refrigerant now exits valve 270 through port 284 and flows to valve 280 where refrigerant enters through port 286 via conduit 288. Refrigerant exits valve 280 through port 296 and flows to metering device 298 where the refrigerant experiences a large pressure drop. From metering device 298 the flow path is the same as previously disclosed for the cooling mode.

If valve 248 remains open, refrigerant will flow through ram valve 242 to heat exchanger 260 to metering device 292 and enter valve 280 through port 290 via conduit 294. The refrigerant will merge with refrigerant entering through port 286 and share a common exit port 296. The toggling between these modes does not require the shutdown or equalization interstice common to current state of the art combination units. Each of these oscillations between modes can be accomplished during operation because of the unique function of the tandem flow ray valve 280 without requiring an excessive level of complexity as is common with the current state of the art, namely electrically actuated valves that require a shutdown and pressure equalization period.

The one exception to this occurs in the cooling season. The hot water only mode and the warm air mode share a common refrigerant suction return path to the compressor 236. Consequently, when in the cooling mode, the unit must shut down and allow for pressures to equalize. At the end of the equalization period a pressure differential no longer exists with the ram valve 242 and the adhesive forces associated with the pressure differential will be absent and allow the ram valve 22 to shift positions. After the equalization time period, upon start-up of the hot water only mode, solenoid 254 is briefly energized forcing refrigerant flow to the ram valve 242 via conduit 256. The entry of high pressure refrigerant forces ram valve 242 to change positions, thus creating the desired return path for the air warming mode.

Flow Helix Assembly

Current water source (geothermal) heat pump systems require a means of heat transfer between the flowing refrigerant stream and the flowing water stream. Those familiar with the art will understand the typical methods employed to accomplish this necessary heat transfer function are by means of a coaxial heat exchanger where a first tube within a much larger outer tube conveys refrigerant and the interstitial void created between the inner tube and the outer tube conveys water. Alternatively, a flat plate heat exchanger is used where the heat exchanger has metallic plates stacked with a predetermined spacing between plates providing a flow channel whereby the flow of water and refrigerant are separated by the plates and their order is alternated throughout the stack. The inherent weakness of both types of heat exchangers is related to pressure drop and the expense of construction. The coaxial style is inherently limited in its efficiency due to the issue of pressure drop, primarily on the water side of the heat exchanger. The flow of water through the heat exchanger creates resistance, the higher the volume of flow, he greater the resistance to flow, as is common to all conduits conveying a fluid.

The increase in volume produces a disproportionate pressure drop in a non-linear fashion. The thermal efficiency can be improved by increasing the volume of water flow, but produces a diminishing return, due to the fact that the parasitic electrical loads associated with pumping the water are factored into the heat pump efficiency calculations. As a result, water pressure drop directly affects unit efficiency, and heat pump manufacturers attempt to mitigate the problem by carefully selecting the appropriate size. The problem of pressure drop is also shared by the flat plate heat exchanger as the small flow channels associated with these heat exchangers raise the issue of fluid cohesive properties. These properties are more pronounced on the refrigerant side of the heat exchanger. When refrigerant is compressed by the heat pump compressor, the oil within the compressor sump is entrained in the gaseous refrigerant stream and travels through the system as vapor or as a liquid along with the refrigerant. For example, when the refrigerant is in a liquid state, the oil is dissolved in the refrigerant and due to their common miscibility, when the refrigerant returns to a gaseous state, the oil returns to a saturated vapor/atomized state. Consequently, the oil must be returned to the crankcase sump by means of entrainment with the refrigerant. Due to the divergence in cohesive forces between the oil and refrigerant and the mechanical function of impact coalescence, the oil has a tendency to accumulate in the flat plate heat exchanger, either robbing oil from the crankcase sump or traveling through the system as a slug—either of which is detrimental to the compressor and will ultimately result in premature failure.

Careful selection of a heat exchanger and its orientation can mitigate these potential problems as can the addition of an oil separator in the discharge path of the compressor which separates the oil from the refrigerant and returns it to the crankcase prior to heat exchanger entry. This highlights the additional problem presented by flat plate heat exchangers and their use in water source heat pumps as they are expensive to produce. While having superior heat transfer properties, they are not widely used due to their cost and the potential for the additional expense associated with premature compressor failure and/or the addition of the oil separator. Both the coaxial and the flat plate heat exchanger are limited in their capacity scalability, the former by efficiency and the latter by cost factors.

The coaxial style has a terminal limit as to capacity, the larger the internal flow passages get, the less turbulent the flow through them and consequently the thermal efficiency drops. The loss of thermal efficiency can only be mitigated by higher volume water flow which becomes impractical due to the parasitic cost of pumping the higher volume.

The flat plate heat exchanger scalability problem is associated with cost, due to very high pressures associated with modern refrigerants, larger surface area flat plates require significant internal and external reinforcement. Consequently, costs per ton of capacity can grow exponentially and begin to render them an impractical choice. As a result of these limitations, the coaxial heat exchanger is the dominant choice in the industry. A device that solves the problems of pressure drop, oil return, and capacity scalability is needed in the art along with a system having the necessary water pumping function common to water source heat pumps.

Well known in the art is that water source heat pumps require water or a water antifreeze solution to be circulated through the refrigerant to water heat exchanger. To perform this function, there exists an aftermarket flow station configuration. The aftermarket system utilizes pressurized well water as its source. When the heat pump cycles on, an automatic valve is opened allowing a predetermined amount of water to flow through the unit, where the required refrigerant to water heat exchange occurs and then the water exits the unit to be dumped either by reinjection to the well source aquifer or to a drain. These systems are referred to as open loop systems. The open loop system solves the problems associated with closed loop systems such as those that recirculate the water through a ground loop heat exchanger or by other external means of heat exchange.

The flow station previously mentioned, comes in two types, with one type being a pressurized pump pack and the other a pressure less reservoir type. The pressurized pump pack is an inherently weak method to accomplish the water flow function. These systems present issues associated with air extraction and antifreeze introduction. Air trapped within the piping system is difficult to remove and may require additional air extraction devices to maintain efficiency. The system pressure must also be monitored in order to eliminate air migration into the system as is common to hydronic piping systems. Each of these problems results in higher than necessary maintenance costs and reliability issues.

U.S. Pat. No. 5,244,037 teaches a system with a pressurized flow station. The system has become known in the industry as a pressure-les flow station. The pressurized nature of the approach speaks solely to the motive force pressure applied by the system pump, but when at rest the system is without hydraulic pressure when observed at its maintenance access port. Consequently, the '037 patent solves the problems inherent with a pressurized pump pack flow station, but does not solve the problems associated with both types of external aftermarket flow stations such as the added difficulty and expense of installing the systems. The aftermarket nature for flow stations requires installation in a location that is remote to the heat pump unit. Consequently, one of the two water conveying conduits connected to the ground loop heat exchanger must travel to the flow station water in port, and another conduit must be connected to the water out port of the flow station and travel to the heat pump water in port. The second conduit connected to the ground loop heat exchanger travels to the heat pump water out port, thus completing the water circulation pathway from the ground loops to the flow station to the heat pump and back to the ground loops. The convoluted piping scheme causes additional piping expense and introduces the possibility of a field installation error when selecting the in and out ports at the flow station and the heat pump. The result of which being an unknown alteration of capacity and efficiency and a departure from the unit's certified rating in both categories. A further problem is the need to install electrical power wiring to actuate the flow station's pumps when the heat pump cycles on.

Figure 11:
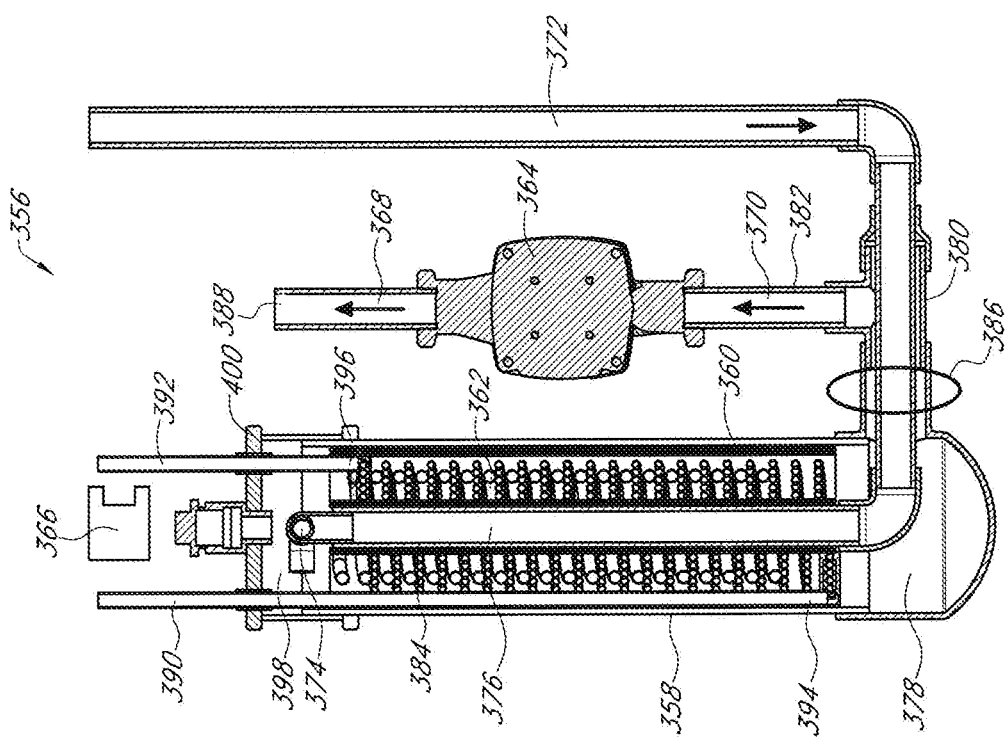
FIG. 11 is a side sectional view of a flow helix heat exchange assembly.

A flow helix assembly 356 integrates the function a heat exchanger and a reservoir style pressure-less flow station, while solving the problems associated with the current state of the art flow stations. Referring to FIG. 11, the flow helix assembly 356 includes an outer body 358 that preferably is cylindrical, a spacer 360, interior refrigerant coils 362, a pump 364, an access port 366, a check valve 368 and a plurality of connective conduits. When the flow helix assembly 356 is cycled on, the pump 364 is activated and begins pumping water in the flow direction 370. Water enters from the ground loop heat exchanger via conduit 372 and flows into the outer body 358 where the water is routed to a diffuser 374 via conduit 376 and is released into the body 358 through a plurality of outlets at the diffuser 374. The flow pattern induced by the diffuser 374 is perpendicular to the radius of the body 358 causing the water to swirl in a circular motion within the outer body 358 and spacer 360. The action of the pump simultaneously creates a low pressure zone at chamber 378 via conduits 380 and 382. This low pressure zone, coupled with the water entering the body 358 at the diffuser 374 causes the swirling water to enter the flow channel 384 created by the copper helical refrigerant coils 362 located within body 358.

The coils 362 include nested copper tubing oriented along a single plane and in contact proximity with each other as well as the internal surface of the spacer 360 and the external surface of conduit 376 that passes through the center of body 358. The planer assembly of nested copper tubing is then formed into a spiral helix rotated about the central axis of the body 358 with a gradual drop in elevation as it is rotated about the body's 358 axis in a continuous manner such that a helix is formed with a predetermined angle of deflection sufficient to create a void between lower and upper plains of the nested coil assembly where this void becomes the water flow channel 384. The flow channel 384 boundaries are defined as the lower plane of the upper coil, the upper plane of the lower coil, the external surface of conduit 376 and the internal surface of spacer 360.

The number of discreet copper tubes in contact proximity will determine the width of the helix and will affect the capacity of the heat exchanger as well as determining the upper and lower boundaries of the flow channel 384. The predetermined angle of deflection that enables the helical form will determine the flow channel 384 boundaries at spacer 360 and conduit 376. The manipulation of tubing quantities and the angle of deflection have a direct bearing on water flow pressure drop through the flow channel 384 and the flow helix assembly 356 and allow for adjustment to achieve desired results to solve the problem of capacity scalability. The capacity can be increased by either increasing the width of the helix by adding more copper tubes or increasing the length of the helix and/or adjusting the angle of deflection to maximize the flow channel in a manner that minimizes water flow pressure drop while maintaining acceptable heat transfer properties.

Once the water enters the flow channel 384 it follows the flow path created by the copper coil helix 362, the spacer 360 and conduit 376 as described previously. The water flows in this spiral pattern, either liberating or absorbing heat from the coil 362 as is common with water source heat pumps. The water then exits the coil 362 with its coaxial section 386 and conduit 382. The pump then discharges the water via conduit 388 into the ground loop heat exchanger and then it returns from the ground loops to conduit 372 into the ground loop heat exchanger and then it returns from the ground loops to conduit 376 and the process continues until the heat pump is de-energized. Simultaneous to the activation of pump 364 is the activation of the heat pump compressor. Depending on the mode of operation, either heating or cooling, refrigerant enters or exits the heat exchanger via conduits 390 and 392, and either distributes or collects refrigerant via the headers 394 and 396. The headers serve to connect the plurality of copper tubes that comprise the heat exchanger helix coils 362 with the single entry/exit conduits 390 and 392. If the refrigerant enters via conduit 390, it passes to header 394 and the flow is distributed to each of the copper tubes that comprise the helix coils 362. The refrigerant travels through the individual tubes of the helix 362 and either liberates or absorbs heat from the water stream flowing in the flow channel 384. The refrigerant then enters header 396 and is collected from each of the discreet tubes comprising the coils 362 and exits the flow helix assembly 356 via conduit 392 and is conveyed to the compressor—continuously repeating the process until the heat pump 364 is de-energized.

The assembly 356 also allows for access to the interior of the body via the fluid access port 366 preserving the function of the pressure-less flow station antifreeze introduction and air extraction which are enabled. When water and antifreeze are introduced to the system via this port during installation or maintenance, the volute of the pump 364 is automatically flooded when the water level in the reservoir formed by the body 358 rises above the inlet port of the pump 364, thereby priming the pump and facilitating the rapid air purging of the system. When the system is flooded and the helical heat exchanger is completely submerged the water line defines the lower boundary of chamber 398 with lid 400 defining the upper boundary. Chamber 398 provides an expansion area for the water and allows for the release of any accumulated air via port 366.

The function of the one way check valve 368 located in conduit 388 is to prevent siphoning or an unexpected elevation of the water line in the reservoir formed by the outer body 358 when the unit shuts down or is at rest. The primary function of the spacer 360 is to allow a passage for conduit 392 and additional conduits from chamber 378 to chamber 398 and out lid 400. The spacer 360 would be constructed of a compatible material with sufficient resilience to act as a seal between coils 362 and spacer 360 providing a boundary of the flow channel 384 previously described and introducing a larger margin of tolerance for inserting the coils 362 into the body 358.

Figure 12:
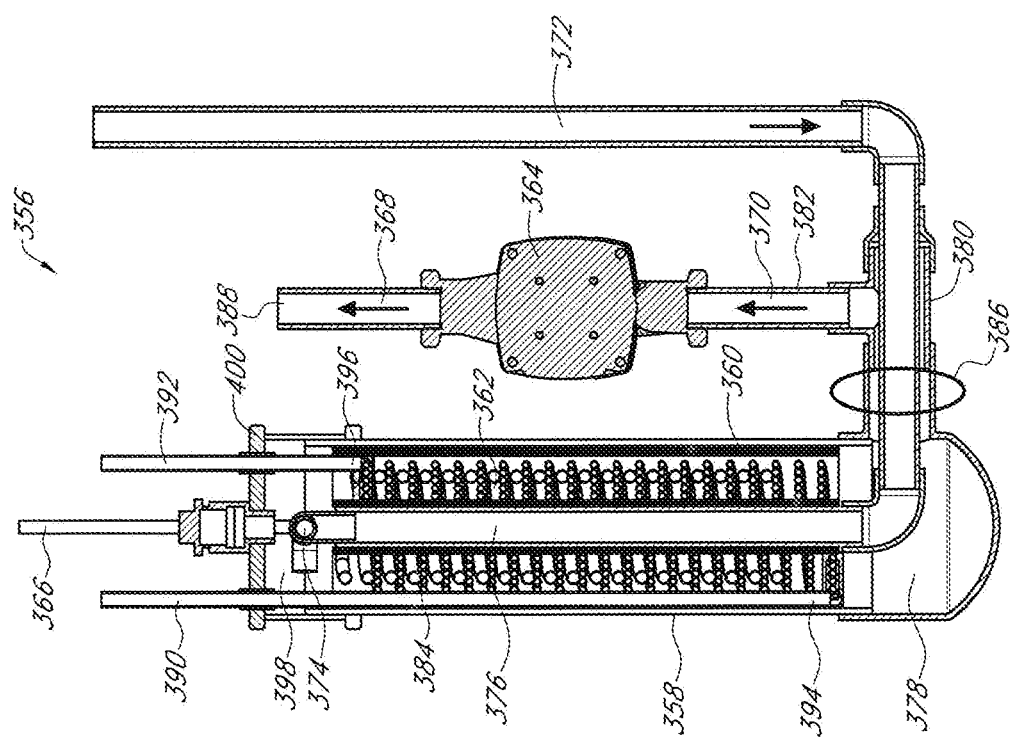
FIG. 12 is a side sectional view of a flow helix heat exchange assembly.

Another embodiment of the flow helix assembly 356 includes the addition of an isolated water coil 402. FIG. 12 shows an example of this embodiment where the water coil 402 is isolated from the refrigerant and water streams, but allows for the transfer of heat either to or from the interstitial water circulating within the body 358 in a like matter to that of coils 362. The water coil 402 also has contact heat transfer from or to the helix coil 362 by means of nesting of the water coil 402 in tangential contact with at least two tubes of the helix coil 362 such as either contact of the two lower helix tubes 362 or two upper tubes. The purpose of the water coil 402 is to create an additional means of generating hot water, but it is not limited to this purpose. The water coil 402 may also carry refrigerant to achieve a desired transfer of heat.

Figure 13:
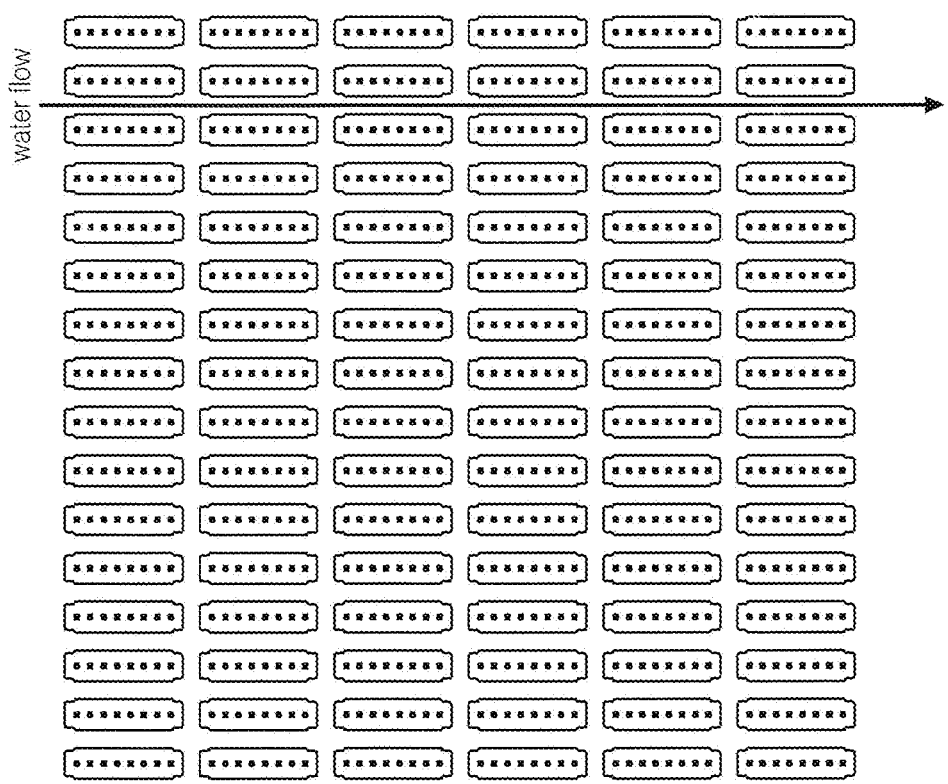
FIG. 13 is a side view of a flow pattern for a flow helix heat exchanger.
Figure 14:
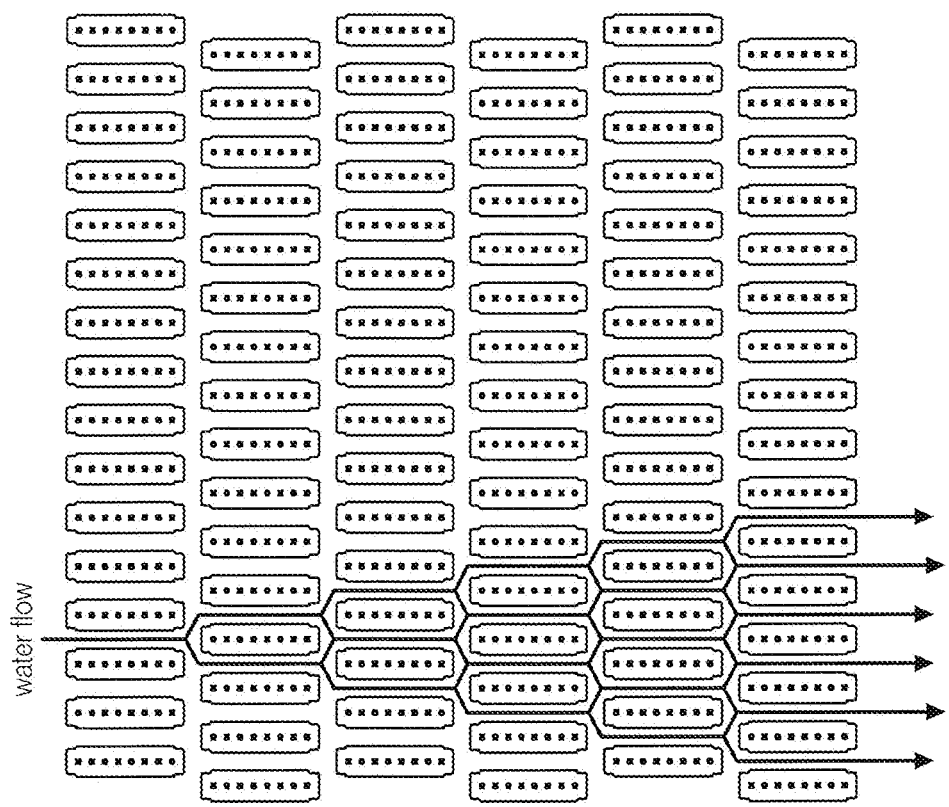
FIG. 14 is a side view of a flow pattern for a flow helix heat exchanger.
Figure 15:
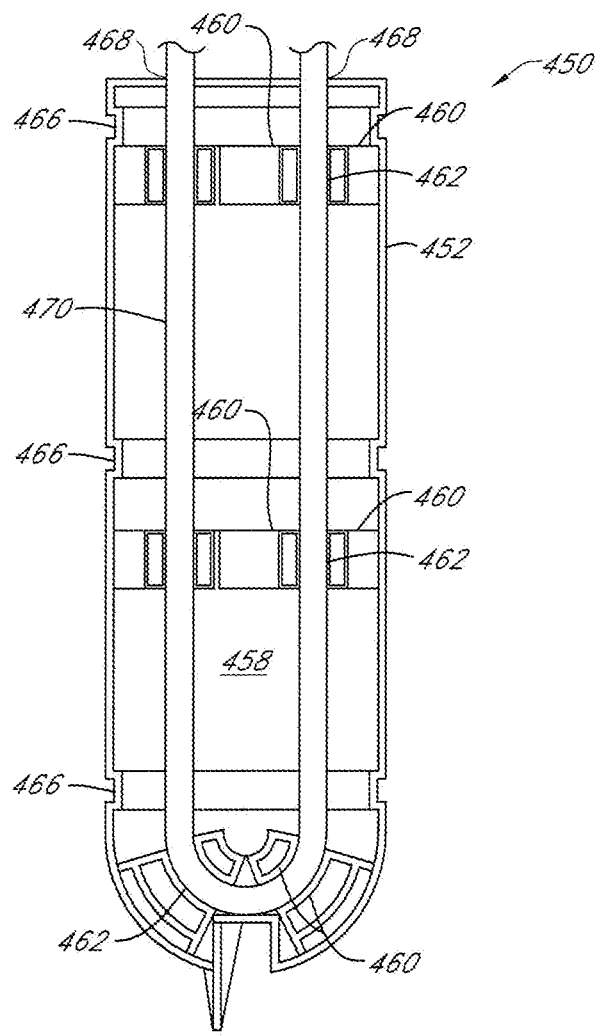
FIG. 15 is a side sectional view of a loop spear.
Figure 16:
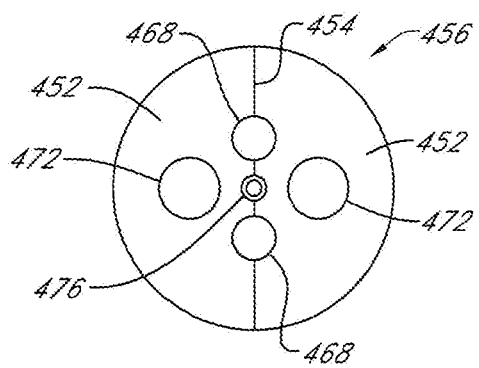
FIG. 16 is a top plan view of a loop spear.
Figure 17:
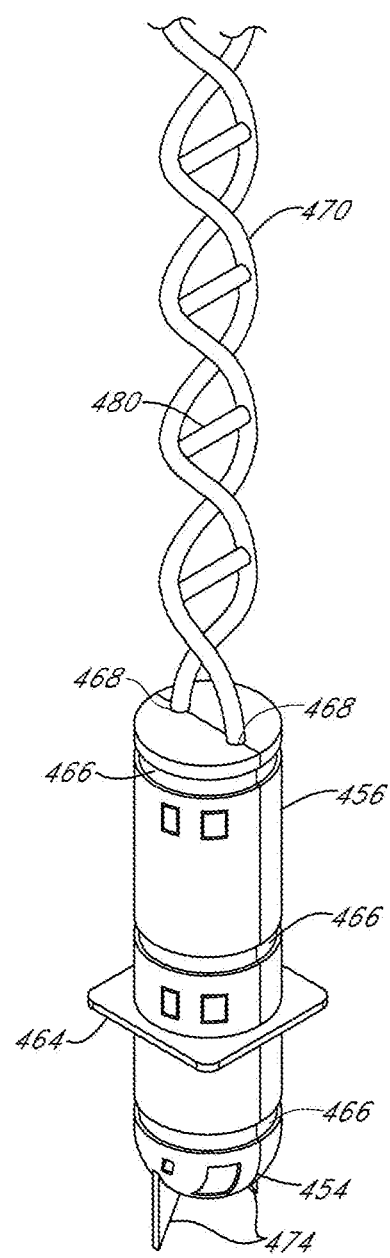
FIG. 17 is a perspective view of a loop spear.
Figure 18:
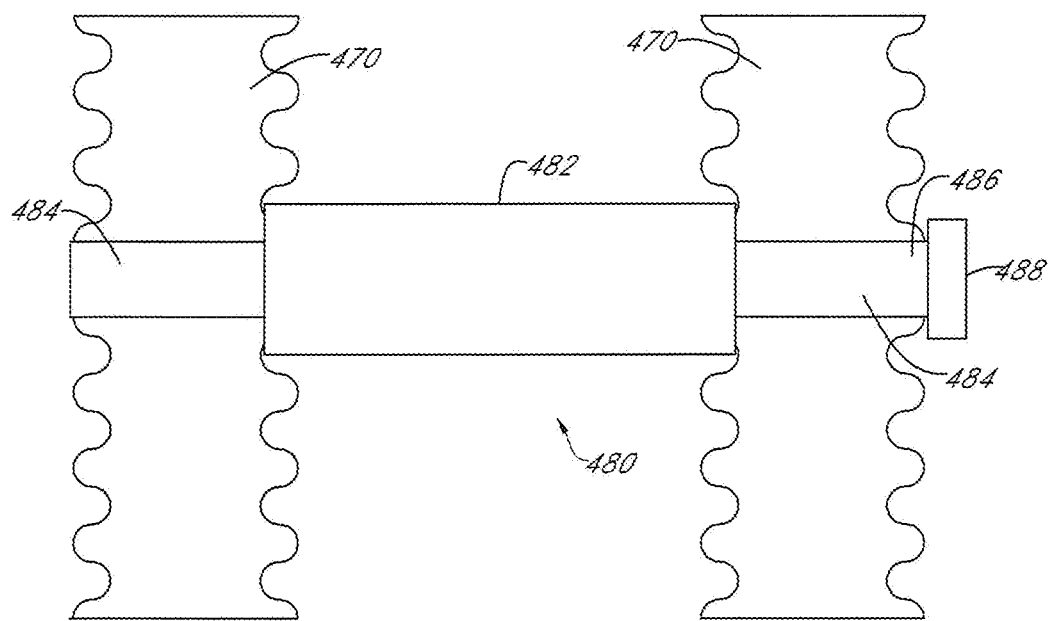
FIG. 18 is a side view of a spacer.
Figure 19:
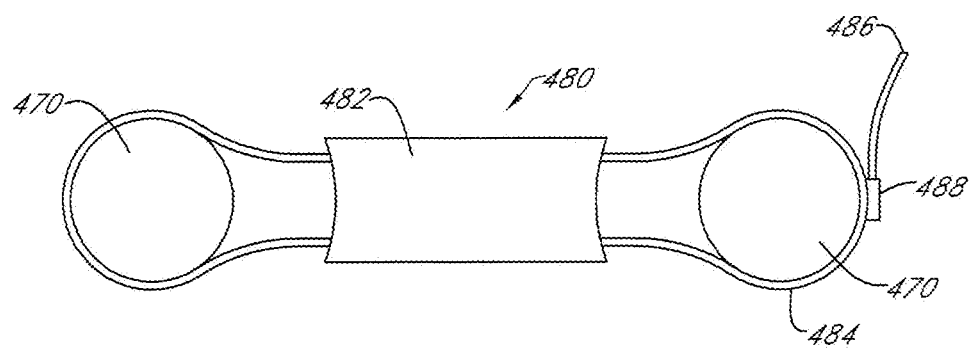
FIG. 19 is a top plan view of a pair of spacers.
Figure 19:
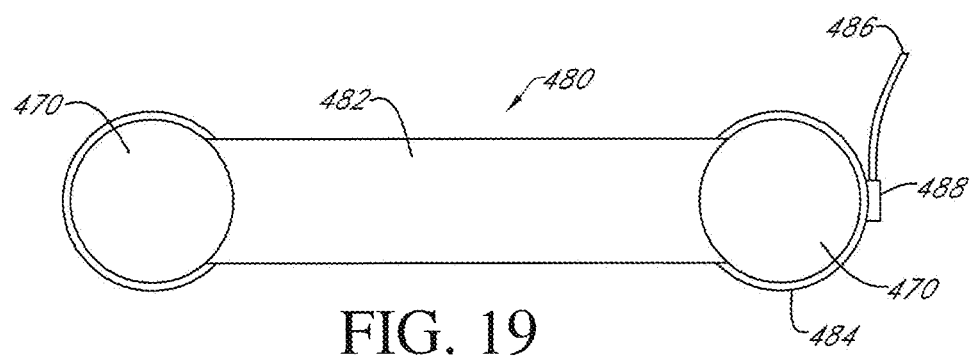

In a further embodiment of the flow helix assembly 356, aluminum micro-channel tubing is utilized in lieu of copper tubing for the construction of the helical coils 362. Micro-channel tubing is gaining popularity in the industry due to lower material cost and significantly lower refrigerant volume required to charge the system. FIG. 13 shows an example of this embodiment where the tubing material provides for a difference in the flow pattern. Rather than utilizing a flow channel 384 created by the geometry of coils 362, forcing a spiraling flow route through the heat exchanger, a linear flow through the heat exchanger is utilized. FIG. 13 shows a cross sectional view of half a micro-channel helix 404 where the micro-channels 404 are stacked creating a linear flow pattern. FIG. 14 shows a cross sectional view where the micro-channels 404 are staggered around the axis of body 358 creating a helix.

Difficulties associated with geothermal loop installation are well known in the art. With bore hole depths typically reaching two hundred feet and beyond, weights consisting pig iron rod are taped to the loop assembly so that gravity pulls the loop down the bore hole. Not only is this practice expensive, but because of different coefficients of expansion between materials and the possibility of concomitant of tubing failure due to mechanical abrasion there exists the potential of damaging the loop tubing.

To improve upon this method stinger rods have been used. Essentially, a loosely weighted rod is suspended from a cable linked to the mast of a drilling rig. The loop and stinger rod are lowered into the bore hole with the mass of the rod providing the required ballast weight. Upon completion of the loop installation the rod is wiggled loose from the loop and the stinger is withdrawn from the hole using the cable.

Frequently, the process of dropping the loop down the bore hole can require and up and down piston type motion in order to get the loop past strictures that have formed in the bore hole. The up and down motion can cause separation between the rod and the loop tubing which leads to possible damage of the tubing or retraction of the loop for reattachment of the rod.

Typically, the loop tubing is configured in a u-shape with the u-bend connecting a downward leg and an upward leg. The u-bend is inserted into the bore hole and the up and down legs reside in a generally parallel orientation with frequent direct tangential contact throughout the length of the bore. This leads to heat transfer, known as thermal cross talk, which has an adverse effect on the geothermal system. Double helical construction of the ground loop heat exchanger dramatically reduces the effect of thermal concentration and thermal cross talk.

Spacers are used to create the helical construction. Current spacers lack sufficient gripping force and have a propensity to slide on the loop conduit and accumulate in a single area, a process known as stacking. Attempts have been made to improve the process, but the cost far outweighs the benefits received. Therefore, an improvement is needed in the art to address these deficiencies.

A geothermal loop assembly having a loop spacer that includes a housing with a top, a bottom, and sidewalls that form a hollow chamber is shown in FIGS. 15-19. Protrusions extend from the inner surface of the housing to form tubing passageways. Tubing is inserted through an opening in the top of the housing, extends through the tubing passageways and exits through a second opening in the top of the housing. At least one more opening in the top of the housing permits a heavy weighted material to be poured into the hollow chamber of the housing. A plurality of spacers with a conduit and draw band are connected to the tubing above the loop spear to create a helical construction.

Referring to the FIGS. 15-19, a loop spear or boot 450 has a pair of clamshell members 452 that connect together along a seam 454 to form a housing 456 with a hollow chamber 458. Each clamshell member 452 has a plurality of protrusions 460 that align and engage within the chamber 458 to form tube passage ways 462.

While the clamshell members 452 are connected in any conventional manner such as with screws, bolts, and the like, preferably the members 452 are joined using one or more outer clamping straps 464, such as a zip tie, gear clamp, or the like, that are received in grooves 466 on the outer surface of the loop spear 450. On the top of the loop spear 450 are a plurality of openings. Two of the openings 468 allow tubing 470 to extend into and out of the hollow chamber 458 through the tube passage ways 462. The additional openings 472, preferably two, permit a heavy material such as water, sand, grout, or the like to be poured into the hollow chamber 458. The pourable material provides the needed ballast for lowering the loop spear 450 into a bore hole by means of gravity. Optionally, a receiver is attached or molded to the top of the loop spear. The receiver 476 permits the attachment of a stinger rod to be used for installation of the weighted loop spear 450.

On the bottom of the loop spear 450 is at least one lance projection 474. The projection 474 provides rotational resistance should the tubing 470 be rotated into a helical profile to increase thermal transfer and minimize cross talk.

A plurality of spacers 480 are attached to the tubing 470 above the loop spear 10 to create a double helical construction for a ground loop heat exchanger. The spacer 480 is critical in maintaining distance between the up leg and down leg of the tubing 470 and must have sufficient staying force to keep the double helix from collapsing on itself. Further, the spacers need to accommodate different types of tubing 470 such as smooth walled high density polyethylene pipe (HDPE), corrugated stainless steel tubing and the like. In one embodiment the spacer 480 has a conduit 482, preferably with a diameter similar to the diameter of the tubing 470, and a draw band clamp 484 capable of exerting high tension forces with corrosion resistant properties.

To attach, a male end 486 of the draw band 484 is fed through the conduit 482 and wrapped around the down leg of the tubing 470. The male end 486 of the draw band 484 is then fed back through the conduit 482 where it is wrapped around the up leg of the tubing 470. The male end 486 of the draw band 484 is then inserted in the female end 488 of the draw band 484 and tightened such that the conduit 482 is brought into contact with the up leg and down leg of the tubing 470 to achieve maximum friction between the conduit 482 and the tubing 470. When used with CSST, when tightened the conduit 482 will engage the corrugations coercively eliminating the possibility spacer stacking.

The conduit 482 is of any size and shape. Preferably the ends are square, but may also be curved to match the diameter of the tubing 470. The conduit 482 may also be separated to accommodate the separate threading of the draw band 484.

Figure 20:
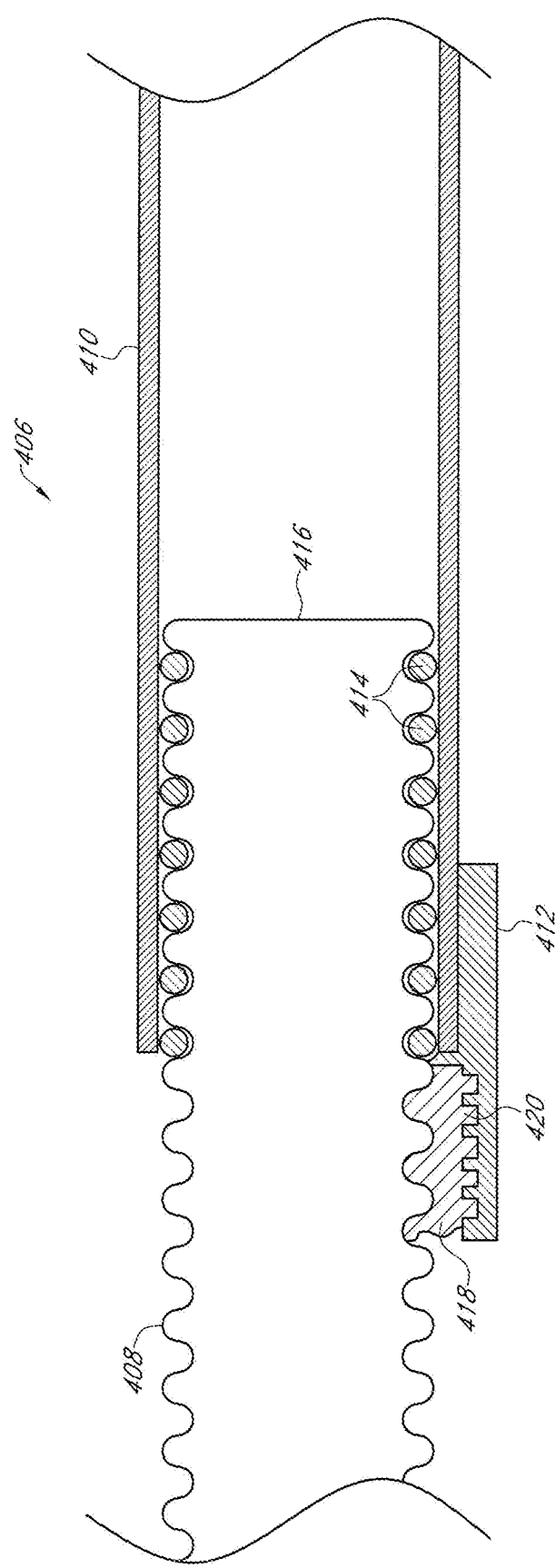
FIG. 20 is a side sectional view of a loop link assembly.

Referring to FIG. 20, shown is a sectional side view of a loop link assembly 406. The assembly includes a corrugated stainless steel tube 408 connected to a pipe 410, preferably made with HDPE, with a fusion collar 412, preferably made of HDPE. A plurality of O-rings 414 are fitted around a first end 416 of tube 408 and provide a primary seal when the first end 416 is inserted into pipe 410. The collar 412 is then fitted over both the pipe 410 and tube 408 and a secondary seal is formed between the collar 412 and the tube through the application of a sealing material 418 such as adhesive mastic, composite or the like. On the interior surface of the collar 412 are a plurality of machined grooves 420. The combination of the corrugated tube 408, the machined grooves 420 and the sealing material 418 provide a pullout or separation resistance.

Figure 21:
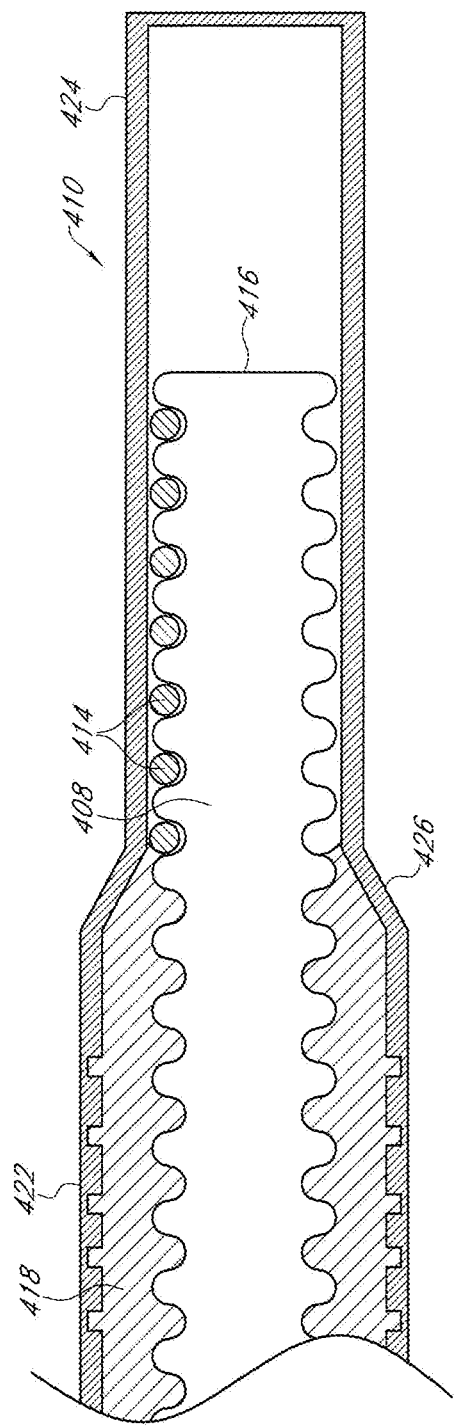
FIG. 21 is a side sectional view of a loop link assembly.

In an alternative embodiment, as shown in FIG. 21, the pipe 410 has a first section 422 that is wider in diameter than a second section 424 and are connected by a tapered section 426. The tube 408 fits within the pipe 410 with O-rings 414 fitted around the first end 416 which is received within the second section 424 of the pipe 410. A second seal is formed by adding sealing material 418 to the first section of the pipe 410 between the tube 408 and the pipe 410. The primary advantage to both systems is the elimination of any mechanical joining methods that include welding, soldering, crimping, threading or external compression while providing multiple layers of defense against leakage or failure in subterranean buried applications inherent to the construction of ground loop head exchangers.

Figure 22:
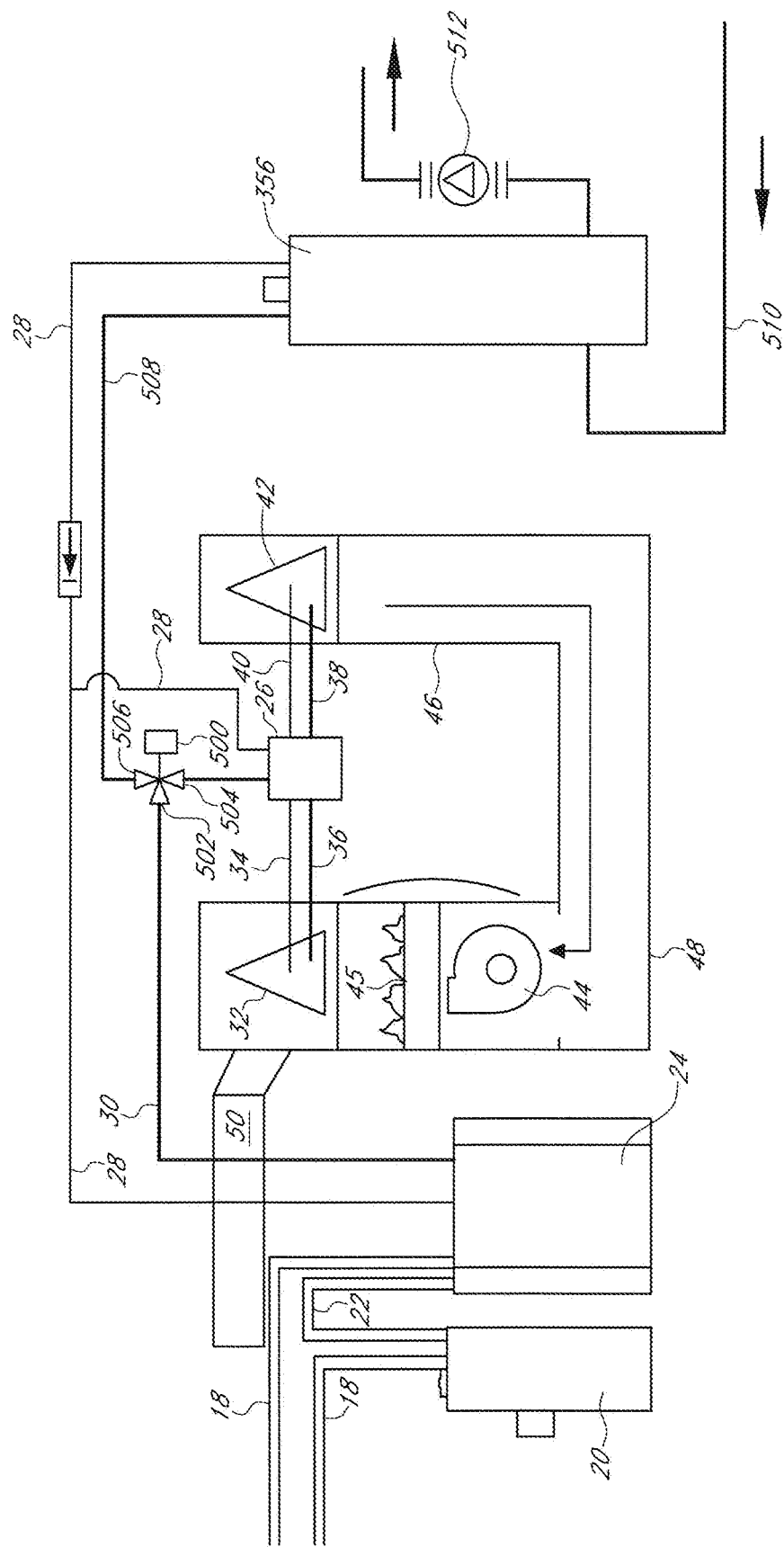
FIG. 22 is a schematic view of a geothermal system having a flow helix heat exchanger assembly.

In yet another embodiment, as shown in FIG. 22, a geothermal system 10 has a diverting valve 500, such as a three way valve or the like connected to conduit 30 between the heat pump 24 and the flow vector assembly 26. The heat pump 24 is connected to a first port 502 and the flow vector assembly 26 is connected to a second port 504. A third port 506 is connected to and in communication with a flow helix assembly 356 via conduit 508. The flow helix assembly 356 is connected to a conduit 510 having a water pump 512 that delivers fluid to a from a hydronic heated water load. The flow helix assembly also is connected to heat pump 24 via conduit 28. A check valve 514 is connected to conduit 28 between the flow helix assembly and both the pump 24 and the flow vector assembly 26.

What is claimed:

1. A geothermal system, comprising:
    a flow station connected to and in fluid communication with a heat pump by a second conduit that extends between the flow station and the heat pump;
    a flow vector assembly connected to and in fluid communication with the heat pump by a third and a fourth conduit that extend between the flow vector assembly and the heat pump;
    the flow vector assembly having a pair of flow ray valves, wherein one of the pair of flow ray valves comprising:
    a housing with a first port, a second port, a third port; an upper torbulus positioned within the housing adjacent the first port;
    the upper torbulus comprising a plurality of ventilation portions, a sealing surface, and a seat disc adjacent the sealing surface;
    a furnace having a cooling coil and a heating coil disposed within ductwork of the furnace wherein the cooling coil is connected to the flow vector assembly by a fifth and a sixth conduit that extends between the cooling coil and the flow vector assembly and the heating coil is connected to the flow vector assembly by a seventh and an eighth conduit that extends between the heating coil and the flow vector assembly wherein in a cooling mode the cooling coil is active and unconditioned air passes through the heating coil which is dormant and is conducted via the ductwork of the furnace into and out of the blower; and
    ground loops extending between and connected to the flow station and the heat pump by a first conduit that extends through the ground between the flow station and the heat pump.

2. The system of claim 1 wherein the flow vector assembly has a ram valve.

3. The system of claim 1 wherein the flow vector assembly has a tandem flow ray valve.

4. The system of claim 1 wherein the flow vector assembly includes a t-section, a solenoid valve, and a pair of check valves.

5. The system of claim 1 wherein the flow vector assembly includes a three port valve and a check valve.

6. The system of claim 1 wherein the flow vector assembly has at least one flow ray valve having a housing with three ports and a sealing disc that selectively seals one of the three ports based upon pressure flow through another of the three ports.

7. The system of claim 1 wherein the third conduit connected to and extending between the heat pump and the flow vector assembly has a diverter valve that is connected to a flow helix assembly.

8. The system of claim 7 wherein the flow helix assembly is connected to a water pump.

9. The system of claim 1 wherein in a heating mode the heating coil is active and the cooling coil is dormant.

10. The system of claim 1 further comprising the one of the pair of flow ray valves having a lower torbulus comprising a plurality of outer ventilation ports and a plurality of inner coaxial ports.

11. The system of claim 10 further comprising the lower torbulus of the one of the pair of flow ray valves further comprising a coaxial receiver, a pair of sealing surfaces, a second seat disc, and an annulus configured to engage the second seat to prevent flow.

12. The system of claim 11 further comprising a compression spring positioned over the annulus.

13. The system of claim 12 wherein the lower torbulus is mounted to a conduit and the conduit has a retaining ring positioned such that the compression spring is positioned between the retaining ring and the lower torbulus.

14. The system of claim 2 further comprising the ram valve comprising: a valve body having a first port, a second port, a third port, a fourth port, and a fifth port; a first torbulus and a second torbulus disposed within the valve body and positioned between the third port and the second port, wherein the first torbulus and the second torbulus each comprising a first seat and a second seat; a first ramrod having a first disc and a second ramrod having a second disc, wherein the first ramrod and the second ramrod extend between the first torbulus and the second torbulus and the first torbulus and the second torbulus have a predefined space between each other.

15. The system of claim 14 further comprising the ram valve having a fitting bearing conduit that confines the first ramrod and the second ramrod and is configured to provide a slide path for the first ramrod and the second ramrod.

16. The system of claim 15 wherein the ram valve is configured to transition between a first position wherein when in the first position a discharge fluid flows along a first flow path a first suction path is formed, and a second position wherein when in the second position the discharge fluid flows along a second flow path and a second suction path is formed.

17. A geothermal system, comprising:

a flow station connected to and in fluid communication with a heat pump;

a flow vector assembly connected to and in fluid communication with the heat pump;

the flow vector assembly having a pair of flow ray valves, wherein one of the pair of flow ray valves comprising:

a housing with a first port, a second port, a third port; an upper torbulus positioned within the housing adjacent the first port; the upper torbulus comprising a plurality of ventilation portions, a sealing surface, and a seat disc adjacent the sealing surface;

a furnace having a cooling coil, a heating coil, and a blower disposed within ductwork of the furnace wherein the cooling coil and the heating coil are connected to the flow vector assembly; and ground loops extending between and connected to the flow station and the heat pump.

18. A geothermal system, comprising:

a flow station connected to and in fluid communication with a heat pump;

a flow vector assembly connected to and in fluid communication with the heat pump;

the flow vector assembly having a ram valve comprising:

a valve body having a first port, a second port, a third port, a fourth port, and a fifth port; a first torbulus and a second torbulus disposed within the valve body and positioned between the third port and the second port, wherein the first torbulus and the second torbulus each comprise a first seat and a second seat; a first ramrod having a first disc and a second ramrod having a second disc, wherein the first ramrod and the second ramrod extend between the first torbulus and the second torbulus and the first torbulus and the second torbulus have a predefined space between each other;

a furnace having a cooling coil, a heating coil, and a blower disposed within ductwork of the furnace wherein the cooling coil and the heating coil are connected to the flow vector assembly; and ground loops extending between and connected to the flow station and the heat pump.

\* \* \* \* \*